United States Patent
Biberg

(10) Patent No.: US 11,561,559 B2
(45) Date of Patent: Jan. 24, 2023

(54) PRESSURE DROP IN LOW LIQUID LOADING FLOWS

(71) Applicant: Schlumberger Technology Corporation, Sugar Land, TX (US)

(72) Inventor: Dag Biberg, Asker (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 628 days.

(21) Appl. No.: 16/604,709

(22) PCT Filed: Apr. 16, 2018

(86) PCT No.: PCT/US2018/027696
§ 371 (c)(1),
(2) Date: Oct. 11, 2019

(87) PCT Pub. No.: WO2018/191736
PCT Pub. Date: Oct. 18, 2018

(65) Prior Publication Data
US 2020/0348701 A1 Nov. 5, 2020

Related U.S. Application Data

(60) Provisional application No. 62/485,460, filed on Apr. 14, 2017.

(51) Int. Cl.
*G05D 7/06* (2006.01)
*E21B 49/08* (2006.01)
(Continued)

(52) U.S. Cl.
CPC ......... *G05D 7/0623* (2013.01); *E21B 47/008* (2020.05); *E21B 47/06* (2013.01);
(Continued)

(58) Field of Classification Search
CPC .. G05D 7/0623; G05D 7/0676; E21B 47/008; E21B 47/06; E21B 49/0875; E21B 43/12;
(Continued)

(56) References Cited

U.S. PATENT DOCUMENTS

2007/0278408 A1 12/2007 Johansen
2013/0220438 A1 8/2013 Hatton et al.
(Continued)

OTHER PUBLICATIONS

A. Banafi et al., "A comprehensive comparison of the performance of several popular models to predict pressure drop in stratified gas-liquid flow with low liquid loading," Journal of Natural Gas Science and Engineering, Elsevier, Amsterdam, NL, vol. 21, Sep. 26, 2014, pp. 433-441.
(Continued)

*Primary Examiner* — Mickey H France

(57) ABSTRACT

Systems, methods, and computer-readable media that improve flow of a multiphase mixture in a fluid transport system by determining pressure drop of low-liquid loading flows are provided. The method includes obtaining physical dimensions of a pipe that transports a multiphase flow. The method also includes obtaining physical parameters of the multiphase flow in the pipe. The method further includes determining an effective toughness of a liquid film of the multiphase flow on an interior wall of the pipe using the physical dimensions of the pipe and the physical parameters of the multiphase flow. Additionally, the method includes determining a pressure drop in the pipe using the effective roughness of the liquid film. Moreover, the method includes determining operating parameters of the system based on the pressure drop in the pipe.

21 Claims, 15 Drawing Sheets

(51) Int. Cl.
| | |
|---|---|
| *E21B 47/008* | (2012.01) |
| *E21B 47/06* | (2012.01) |
| *G01L 13/00* | (2006.01) |
| *F17D 3/01* | (2006.01) |
| *E21B 43/12* | (2006.01) |

(52) U.S. Cl.
CPC ............ *E21B 49/0875* (2020.05); *F17D 3/01* (2013.01); *G01L 13/00* (2013.01); *G05D 7/0676* (2013.01); *E21B 43/12* (2013.01); *E21B 2200/20* (2020.05)

(58) Field of Classification Search
CPC ....... E21B 2200/20; F17D 3/01; G01L 13/00; G01B 5/28; G01B 7/34; G01B 11/30; G01B 13/22; G01B 15/08; G01B 17/08; G01B 21/30
See application file for complete search history.

(56) References Cited

U.S. PATENT DOCUMENTS

| | | | |
|---|---|---|---|
| 2014/0012507 | A1 | 1/2014 | Trehan et al. |
| 2014/0020783 | A1 | 1/2014 | Zazovsky et al. |
| 2015/0285053 | A1 | 10/2015 | Paiva et al. |

OTHER PUBLICATIONS

H. Karami et al., "Modeling study of three-phase low liquid loading flow in horizontal pipes," International Journal of Multiphase Flow, Elsevier, Amsterdam, NL, vol. 91, Jan. 25, 2017, pp. 76-88.
Hong-Quan Zhang et al., "Low liquid loading gas/liquid pipe flow," Journal of Natural Gas Science and Engineering, Elsevier, Amsterdam, NL, vol. 3, May 6, 2011, pp. 413-422.
Extended European search report dated Dec. 18, 2020 in counterpart European patent application No. 18784791.8.
Behroozi, "The calming effect of oil on water," American Journal of Physics, May 2007. vol. 75, Issue 5, pp. 407-414.
Biberg, "Fast and Accurate Approximations for the Colebrook Equation," Journal of Fluids Engineering, Mar. 2017, vol. 139(3), pp. 031401-1-031401-3.
Biberg, et al., "Accounting for flow model uncertainties in gas-condensate field design using the OLGA High Definition Stratified Flow Model," Cannes, France : BHR Group, 2015, 17th International Conference on Multiphase Production Technology, pp. 375-387.
Colebrook, "Turbulent Flow in Pipes, with particular reference to the Transition Region between the Smooth and Rough Pipe Laws," Journal of the Institution of Civil Engineers, 1939, vol. 11, Issue 4, pp. 133-156.
Holm, "Tanzania gas development—flow assurance challenges," France: BHR Group, 2015, 17th International Conference on Multiphase Production Technology, pp. 313-326.
Holm, "Tanzania gas development—flow Assurance Challenges," France: BHR Group, 2017, 18th International Conference on Multiphase Production Technology, pp. 439-453.
Kjølaas, et al., "Experiments for low liquid loading with liquid holdup discontinuities in two- and three-phase flows," Cannes, France : BHR Group, 2015, 17th International Conference on Multiphase Production Technology, pp. 327-342.
Kjølaas, et al., "Pressure drop measurements in low liquid loading three-phase flows," Cannes, France: BHR Group, 2017, 18th International Conference on Multiphase Production Technology, pp. 455-470.
McKeon, et al., "Further observations on the mean velocity distribution in fully developed pipe flow," Journal of Fluid Mechanics, 2004, vol. 501, pp. 135-147.
Nossen, et al., "Analysis of hydraulic gradients in large scale experiments," Cannes, France: BHR Group, 2015, 17th International Conference on Multiphase Production Technology, pp. 343-356.
Raajinder, et al., "Viscosity/Concentration Relationship for Emulsions," Journal of Rheology, vol. 33, Issue 7, Oct. 1989, pp. 1021-1045.
Skartlien, et al. "A statistical model for the average volume fraction profile through the mixing zone in turbulent stratified gas-liquid flow," International Journal of Multiphase Flow, vol. 59, 2014, pp. 160-172.
Staff, et al., "Validation of OLGA HD against transient and pseudo-transient experiments from the SINTEF large diameter high pressure flow-loop," Cannes, France: BHR Group, 2015, 17th International Conference on Multiphase Production Technology, pp. 357-373.
International Search Report and Written Opinion for the International patent application PCT/US2018/027696 dated Jul. 30, 2018.
International Preliminary Report on Patentability for the International patent application PCT/US2018/027696 dated Oct. 24, 2019.

PRESSURE DROP IN LOW LIQUID LOADING FLOWS

CROSS-REFERENCE TO RELATED APPLICATIONS

This application claims priority to U.S. Provisional Patent Application No. 62/485,460 entitled "Pressure Drop in Low Liquid Loading Flows," filed Apr. 14, 2017, the content of which is incorporated herein in its entirety.

BACKGROUND

Multiphase flow occurs when separate phases of gases, liquids, and/or solid particles flow simultaneously as a mixture. Multiphase flow may involve complex irregular interactions between the flowing phases inducing pressure drops, deposits, liquid accumulation, and unstable flows. These phenomena may occur in a wide range of applications ranging from large scale industrial processes (e.g., pharmaceutical, paper, food, metallurgical industries, and the like) to small scale applications (e.g., cooling systems, combustion engines, etc.).

One particular area where understanding and managing multiphase flow is important is transportation of hydrocarbons in pipelines. Fluid flow in pipelines of oil and gas reservoirs typically involves simultaneous flows of water, oil, and gas. Low-liquid-loading flow is a flow condition that may occur in pipelines when the flow rate of the liquids (e.g., water and oil) is very small compared with the flow rate of the gas. For example, low-liquid-loading flow commonly occurs in wet-gas and gas-condensate pipelines. Even though the pipeline is fed with single-phase gas, the condensation of heavier components of the gas phase, along with traces of water, results in a multiphase flow. Furthermore, the risk of water being present means that operators may choose to add MEG (methylene glycol), a hydrate inhibitor, to the flow, increasing the volume and viscosity of the aqueous phase. The presence of the liquids in the pipeline, although in very small amounts, can significantly influence flow characteristics, such as pressure drops and liquid accumulation. Therefore, understanding of the flow characteristics of low-liquid-loading flows is of great importance in transportation of wet gases. It follows that it is important to understand and predict possible multiphase behavior and complex fluid-related effects which may occur in the pipelines during design and operation of oil and gas transportation lines.

Current techniques for predicting pressure drop in multiphase flows involve collecting flow data from a pipeline system, and using such data to predict pressure variations using models (e.g. a stratified flow model). However, the current techniques inaccurately estimate the pressure drop. The inaccuracies may be worse in the case of deep reservoirs and long pipelines. Accordingly, in an attempt to account for the inaccuracies, an individual analyzing the reservoir and pipeline system (e.g., a geophysicist, a geologist, a pipeline engineer, or a reservoir engineer) may apply unrealistically large friction parameters in a model of the system in an attempt to make the output of the model better reflect actual pressure drop in the system. This can produce inaccurate results that can reduce the efficiency and safety of operations at the reservoir.

SUMMARY

Implementations of the present disclosure may provide a method for improving flow of a multiphase mixture in a fluid transport system by determining pressure drop of low-liquid loading flows. The method includes obtaining physical dimensions of a pipe that transports a multiphase flow. The method also includes obtaining physical parameters of the multiphase flow in the pipe. The method further includes determining an effective roughness of a liquid film of the multiphase flow on an interior wall of the pipe using the physical dimensions of the pipe and the physical parameters of the multiphase flow. Additionally, the method includes determining a pressure drop in the pipe using the effective roughness of the liquid film. Moreover, the method includes determining operating parameters of the fluid transport system based on the pressure drop in the pipe.

Implementations of the present disclosure may also provide a system for improving flow of a multiphase mixture in a fluid transport system by determining pressure drop of low-liquid loading flows. The system includes one or more processors and a memory system. The memory system includes one or more non-transitory computer-readable media storing instructions that, when executed by at least one of the one or more processors, cause the computing system to perform operations. The operations include obtaining physical dimensions of a pipe that transports a multiphase flow. The operations also include obtaining physical parameters of the multiphase flow in the pipe. The operations further include determining an effective roughness of a liquid film of the multiphase flow on an interior wall of the pipe using the physical dimensions of the pipe and the physical parameters of the multiphase flow. Additionally, the operations include determining a pressure drop in the pipe using the effective roughness of the liquid film. Moreover, the operations include determining operating parameters of the fluid transport system based on the pressure drop in the pipe.

Implementations of the present disclosure may also provide a non-transitory computer-readable medium storing instructions that, when executed by at least one processor of a computing system, cause the computing system to perform operations. The operations include obtaining physical dimensions of a pipe that transports a multiphase flow. The operations also include obtaining physical parameters of the multiphase flow in the pipe. The operations further include determining an effective roughness of a liquid film of the multiphase flow on an interior wall of the pipe using the physical dimensions of the pipe and the physical parameters of the multiphase flow. Additionally, the operations include determining a pressure drop in the pipe using the effective roughness of the liquid film. Moreover, the operations include determining operating parameters of the fluid transport system based on the pressure drop in the pipe.

In some implementations of the method, the system, and the non-transitory computer-readable medium, the physical dimensions of the pipe include a diameter of the pipe.

In some implementations of the method, the system, and the non-transitory computer-readable medium, the physical parameters of the multiphase flow include gas density, liquid density, gas velocity, surface tension, shear stress, and coefficient of friction.

In some implementations of the method, the system, and the non-transitory computer-readable medium, determining the effective roughness includes determining the effective roughness due to viscosity of the liquid film.

In some implementations of the method, the system, and the non-transitory computer-readable medium determine the effective roughness due to viscosity of the liquid film by determining a viscosity of liquid in the multiphase flow.

In some implementations of the method, the system, and the non-transitory computer-readable medium, determining the effective roughness includes determining the effective roughness due to surface tension of the liquid film.

In some implementations, the method, the system, and the non-transitory computer-readable medium determine the effective roughness due to surface tension of the liquid film by determining a surface tension of liquid and gas in the multiphase flow In some implementations of the method, the system, and the non-transitory computer-readable medium, determining the effective roughness includes determining an effective roughness due to viscosity of the liquid film based on a velocity of the multiphase flow, a diameter of the pipe, a viscosity of liquid in the multiphase flow, a density of the liquid, a density of gas in the multiphase flow, a velocity of the gas, and a kinematic viscosity of the liquid. Determining the effective roughness also includes determining an effective roughness due to surface tension of the liquid film based on the diameter of the pipe, the density of the liquid, the density of the gas, the velocity of the gas, and a surface tension of the gas and the liquid. Determining the effective roughness further includes selecting a maximum one of the effective roughness due to viscosity of the liquid film and the effective roughness due to surface tension of the liquid film.

In some implementations of the method, the system, and the non-transitory computer-readable medium, determining the operating parameters includes determining an operating rate of a pump of the fluid transport system, and operating the pump using the operating rate.

In some implementations of the method, the system, and the non-transitory computer-readable medium, determining the operating parameters includes determining a diameter for the pipe, and building the fluid transport system using that value for the diameter.

It will be appreciated that the foregoing summary is intended merely to introduce several aspects of the disclosure that follows. These and other aspects are described in greater detail below. Accordingly, this summary is not intended to be exhaustive, and thus should not be considered limiting.

BRIEF DESCRIPTION OF DRAWINGS

The accompanying drawings, which are incorporated in and constitute a part of this specification, illustrate implementations of the present teachings and together with the description, serve to explain the principles of the present teachings.

DETAILED DESCRIPTION

Figure 1:
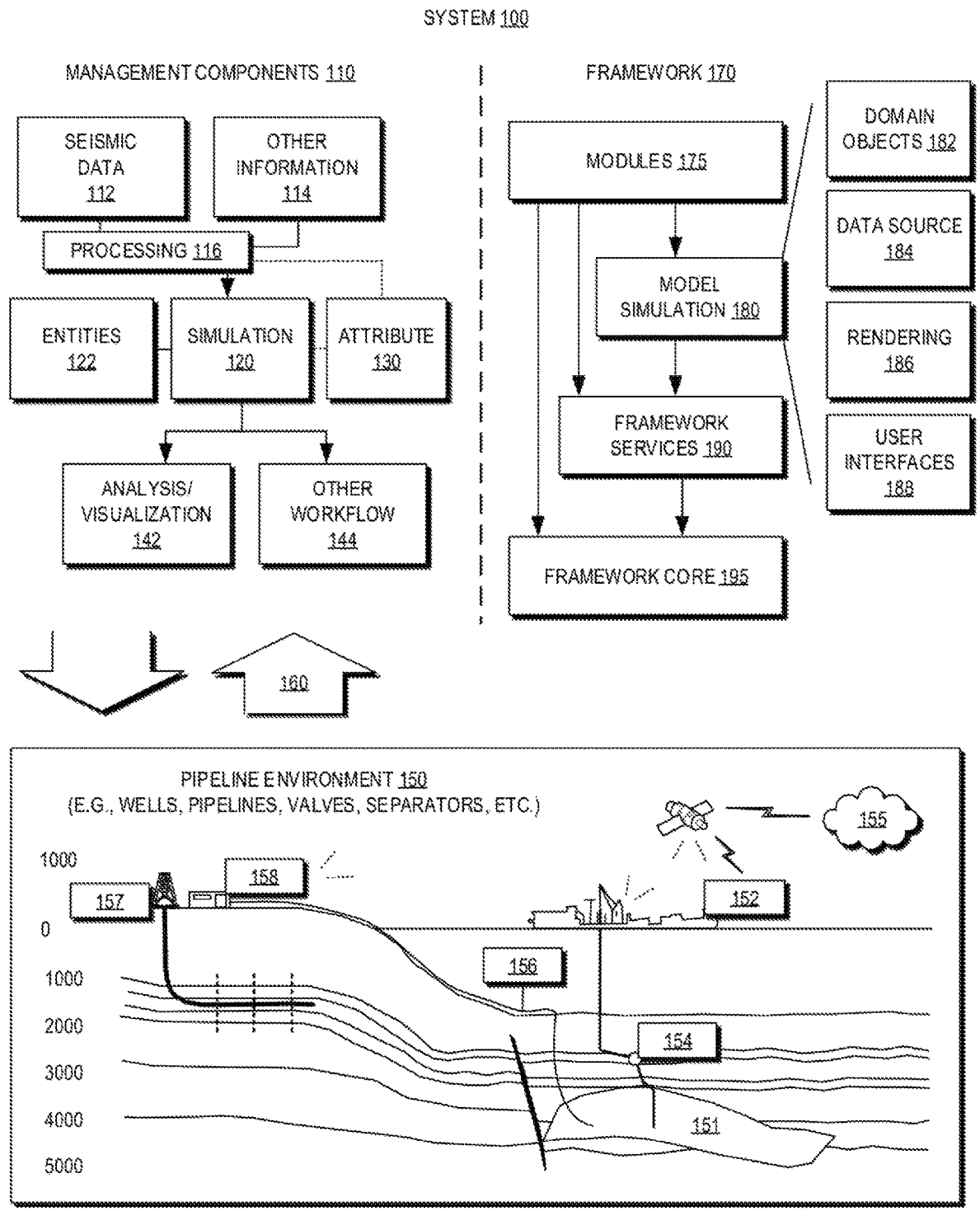
FIG. 1 illustrates an example of a system that includes various management components to manage various aspects of a pipeline environment, according to some implementations.

The present disclosure provides systems and methods for determining pressure drop in low-liquid loading of multiphase flows in pipelines of fluid transport systems. Implementations of the systems and methods disclosed herein more accurately model pressure drops in pipeline components to improve the design, operation, safety, and efficiency of fluid transport systems. Implementations consistent with those herein can determine an effective roughness in pipes due to thin liquid films that may be held in place between the gas and pipe walls by the turbulent pressure fluctuations at high gas rates (e.g. low-loading flows). In some implementations, the model disclosed herein may be used for annular flows in substantially vertical pipes at high gas rates.

To improve determinations of effective roughness and pressure drop of multiphase flows, the present disclosure provides a model using apparent wall roughness associated with a thin liquid film on a wall of the pipe during low-liquid loading. The model is based on dimensional analysis, which, in the case of a viscous film, leads to an analogy with the viscous sublayer in a single phase flow. Additionally, the model approximates three-phase flows by applying the two phase model with effective properties for the oil-water mixture. To support the model development, experiments were conducted in a 4-inch diameter, 50 m-high riser at a test facility. The model of effective roughness for a thin liquid film disclosed herein provides results that are in very good agreement with the experimental data. The disclosed model also provides a robust estimate of liquid in excess of that which can flow in the liquid film that is entrained into the gas phase through the action of interfacial turbulence.

Reference will now be made in detail to implementations, examples of which are illustrated in the accompanying drawings and figures. In the following detailed description, numerous specific details are set forth in order to provide a thorough understanding of implementations. However, it will be apparent to one of ordinary skill in the art that implementations may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of implementations. The first object or step, and the second object or step, are both, objects or steps, respectively, but they are not to be considered the same object or step.

The terminology used in the description of implementations herein is for the purpose of describing particular implementations only and is not intended to be limiting of implementations. As used in the description of implementations and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some implementations. Some operations in the processing procedures, methods, techniques and workflows disclosed herein may be combined and/or the order of some operations may be changed.

FIG. 1 illustrates an example of a system 100 that includes various management components 110 to manage various aspects of a pipeline environment 150 (e.g., an environment that includes wells, transportation lines, risers, chokes, valves, separators, etc.). For example, the management components 110 may allow for direct or indirect management of design, operations, control, optimization, etc., with respect to the pipeline environment 150. In turn, further information about the pipeline environment 150 may become available as feedback 160 (e.g., optionally as input to one or more of the management components 110).

In the example of FIG. 1, the management components 110 include a pipeline configuration component 112, an additional information component 114 (e.g., fluid measurement data), a processing component 116, a simulation component 120, an attribute component 130, an analysis/visualization component 142 and a workflow component 144. In operation, pipeline configuration data and other information provided per the components 112 and 114 may be input to the simulation component 120. For example, the configuration data can include physical dimensions (e.g., length, diameter, thickness, and roughness) pipes and other components that may be used in the pipeline environment 150. Other information can include, e.g., predefined constants (e.g., $c_o$, $c_k$, $c_{ug}$) and reference information. In an example embodiment, the simulation component 120 may rely on pipeline components or "entities" 122. The pipeline components 122 may include pipe structures and/or equipment. In the system 100, the components 122 can include virtual representations of actual physical components that are reconstructed for purposes of simulation. The components 122 may include components based on data acquired via sensing, observation, etc. (e.g., the pipeline configuration 112 and other information 114). An entity may be characterized by one or more properties (e.g., a pipeline model may be characterized by changes in pressure, heat transfer, pipe inclination and geometry, etc.). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the pipeline environment 150, which may be relied on to simulate behavior of the pipeline environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as a simulator provided in OLGA® (Schlumberger Limited, Houston Tex. Further, in an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, pipeline engineers, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially-available OCEAN® framework where the model simulation layer 180 is the commercially-available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of pipeline configuration, one or more attributes based at least in part on pipeline configuration, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the pipeline environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or include circuitry for imagery (e.g., spatial, spectral, temporal, radiometric, etc.).

FIG. 1 also shows the geologic environment 150 as optionally including equipment 157 and 158 associated with a well. As an example, the equipment 157 and/or 158 may include components, a system, systems, etc. for pipeline condition monitoring, sensing, valve modulation, pump control, analysis of pipeline data, assessment of one or more pipelines 156, etc. The pipelines 156 may include at least a portion of the well, and may form part of, or be representative of, a network of pipes which may transport a production fluid (e.g., hydrocarbon) from one location to another.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on pipeline configuration, seismic attribute(s), etc. As an example, a workflow may be a process implementable in the OCEAN® framework. As an example, a workflow may include one or more worksteps that access a module such as a plug-in (e.g., external executable code, etc.).

Figure 2:
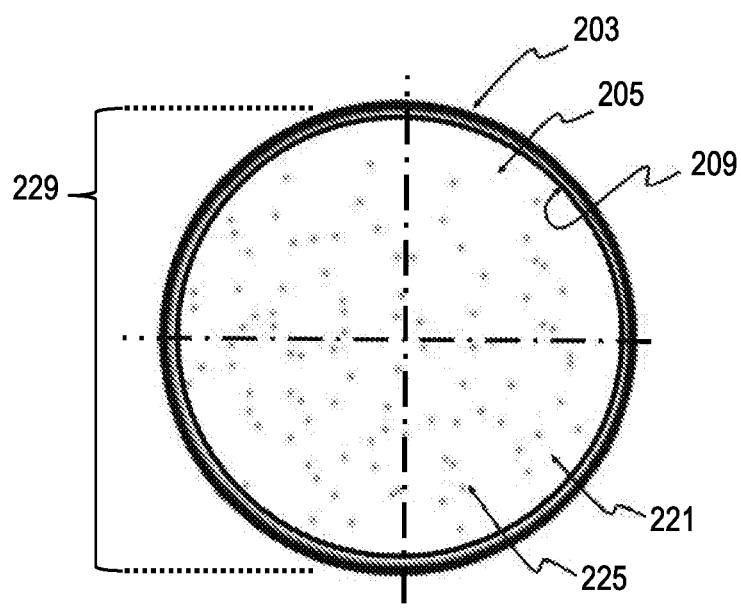
FIG. 2 illustrates a cross-sectional view of a pipe depicting an example of an annular, multiphase flow, according to some implementations.

FIG. 2 illustrates a cross-sectional top view of a vertically oriented pipe 203 depicting an example of annular flow of a multiphase mixture 205, which forms a liquid film 209 on an interior wall of the pipe 203. The multiphase mixture 205 can include, for example, gas 221 and liquid 225 (e.g., water and oil droplets). The liquid film 209 can be a thin annular layer covering the interior wall of the pipe 203, and which may be held in place on the pipe by turbulent pressure fluctuations. The flow in the liquid film 209 is assumed to remain predominantly viscous, and the excess turbulent liquid may be entrained into the gas 221 as droplets of the liquid 225.

In accordance with aspects of the present disclosure, the liquid film 209 is understood to modify the pressure drop in the multiphase mixture 205 as it moves through the pipe 203. A gradient of the pressure drop can be given by the following equation:

$$-\frac{dp}{dx} = \frac{4\tau_i}{D_g} + \rho_g g \quad (1)$$

wherein:
$\tau_i$ represents shear stress,
$D_g$ represents the diameter of the gas 221,
g represents acceleration due to gravity, and
$\rho_g$ represents the density of the gas 221 and the liquid 225 multiphase mixture 205.

It is understood that the interfacial shear stress ($\tau_i$) between the gas (221) and the liquid film 209 can be assumed to be substantially equal to the wall shear stress (i.e., $\tau_i \approx \tau_w$) and the effective diameter of the gas core ($D_g$) can be assumed to be substantially equal to the diameter of the pipe 203 (i.e., $D_g \approx D$). Additionally, it is understood that the liquid 221 in the gas 225 can be assumed to travel with substantially the same velocity as the gas 225.

The liquid fraction in the gas is given by the following equation:

$$\phi_{Lg} = \frac{U_{SL}^g}{U_{SG} + U_{SL}^g} \quad (2)$$

wherein:
$U_{SG}$ is the superficial velocity of the gas 221, and
$U_{SL}^g$ is the superficial velocity of the liquid 225 in the gas 221.

From Equation (2), it follows that the density of the multiphase mixture 205 (e.g., gas and water droplets) is:

$$\rho_g = (1-\phi_{Lg})\rho_G + \phi_{Lg}\rho_L \quad (3)$$

wherein $\rho_G$ and $\rho_L$ are the phase densities of the gas 221, and the liquid 225, respectively.

It can be assumed that flow of the multiphase mixture 205 (e.g., the mixture of the liquid 221 and the gas 225) may be represented by the following equation for the logarithmic velocity distribution in the vicinity of the liquid film at the pipe wall:

$$u_g = \frac{u_{ig}^*}{\kappa} \ln\left(\frac{y}{y_0}\right) \quad (4)$$

wherein:
y is the distance from the interior wall of the pipe 203,
$y_0$ is a generic roughness length scale,
$u_{ig}^* = \sqrt{\tau_i \rho_g}$ is the interfacial friction velocity, and
$\kappa = 0.41$ is the von Karman constant.

Figure 3:
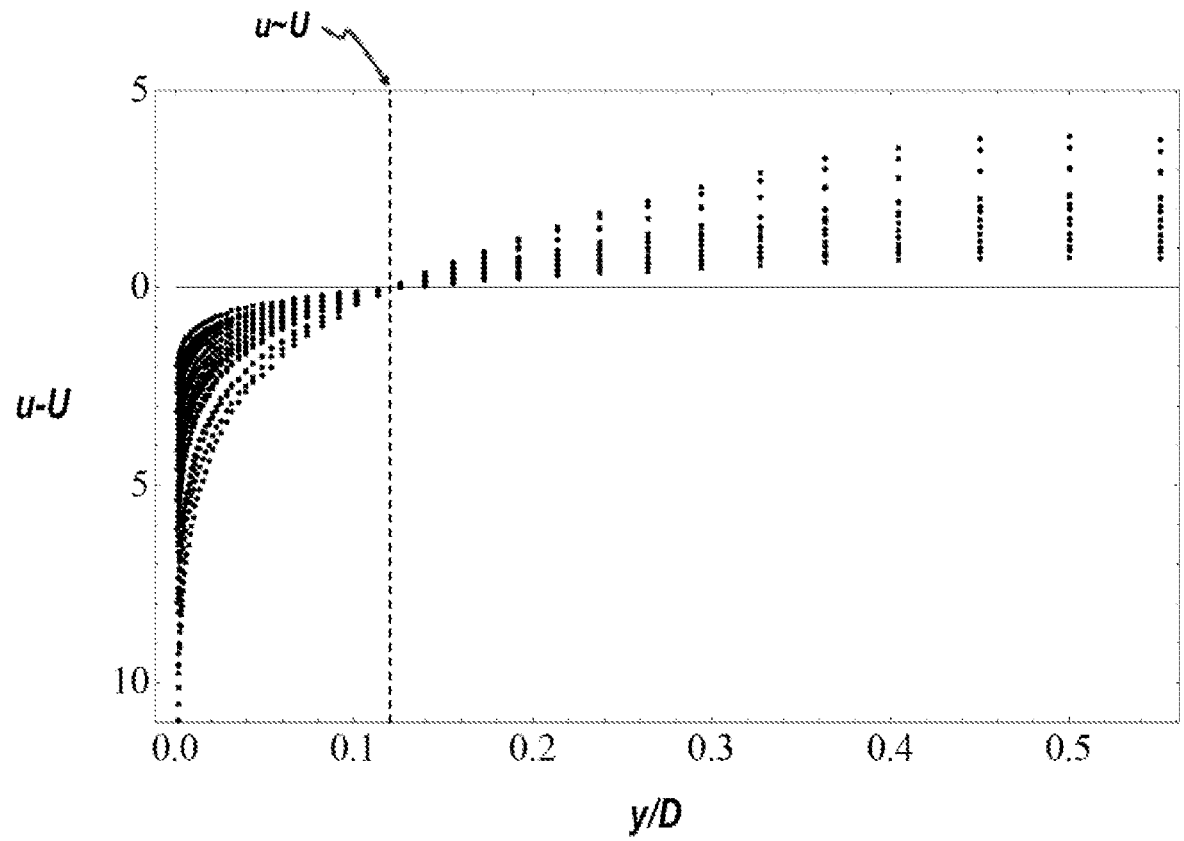
FIG. 3 illustrates a graph showing the variation of the difference between the local velocity and the bulk velocity (u–U) at a distance from an interior pipe wall (y/D) given by high quality data from a test facility.

It can also be assumed that the local velocity (u) is substantially equal to the bulk velocity (U) at a scaled distance $y/D = c_0$ from the pipe wall. The data for single phase pipe flow span a Reynolds number range of $Re = 7.4 \cdot 10^4$ to $3.5 \cdot 10^7$ and reveal that $u \approx U$ for $y/D = 0.12$. FIG. 3 is a graph showing the variation of the difference between the local velocity and the bulk velocity with the scaled wall coordinate y/D. Using Equation (4), this gives the following equation:

$$U_g = \frac{u_{ig}^*}{\kappa} \ln\left(\frac{c_0 D_g}{y_0}\right) \quad (5)$$

wherein $c_0 \approx 0.12$.

Shear stress ($\tau_i$) is modelled using a friction factor ($\lambda_i$), defined by the following equation:

$$\tau_i \equiv \frac{\lambda_i}{4} \frac{\rho_g U_g^2}{2} \quad (6)$$

Introducing base 10 logarithms and the identities $u_{ig}^* = U_g \sqrt{\lambda_i/8}$ and $\ln(10)/(\kappa\sqrt{8}) \approx 2$, gives the following equation for the corresponding generic friction law (which also constitutes the basis of the Colebrook equation):

$$\frac{1}{\sqrt{\lambda_i}} = -2\log_{10}\left(\frac{y_0}{c_0 D_g}\right) \quad (7)$$

Figure 4A:
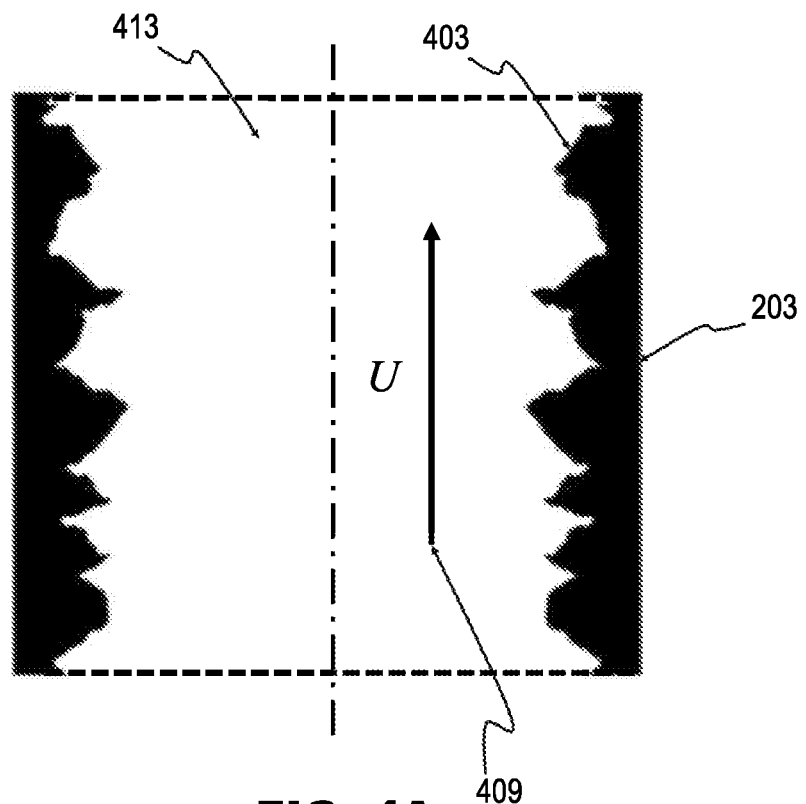
FIG. 4A illustrates a cross-sectional side view of a pipe depicting an example of an interior surface of the pipe according to some implementations.
Figure 4B:
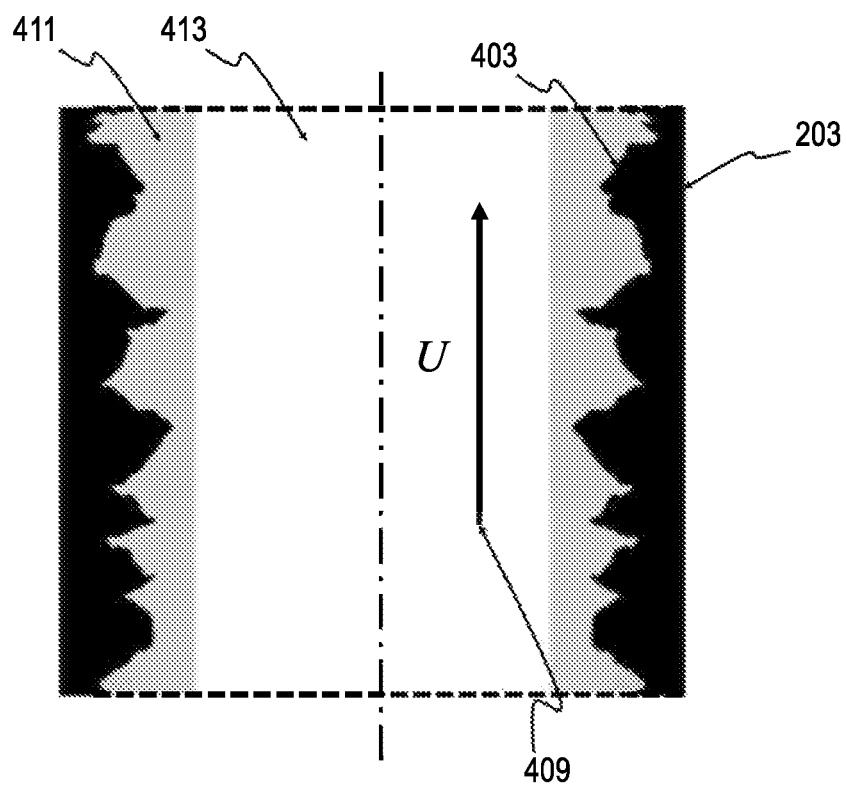
FIG. 4B illustrates a time averaged cross-sectional side view of a pipe depicting an example of the viscous sublayer of hydraulic smooth flow in a pipe at low gas velocities, according to some implementations.
Figure 4C:
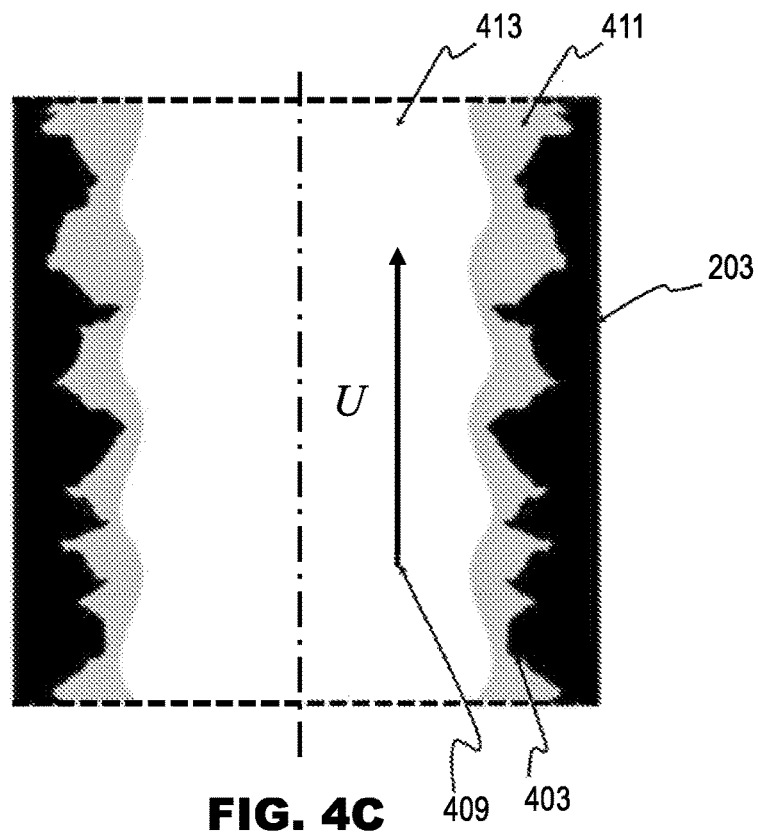
FIG. 4C illustrates an instantaneous cross-sectional side view of a pipe depicting an example of the viscous sublayer of hydraulic smooth flow in a pipe at high gas velocities, according to some implementations.
Figure 4D:
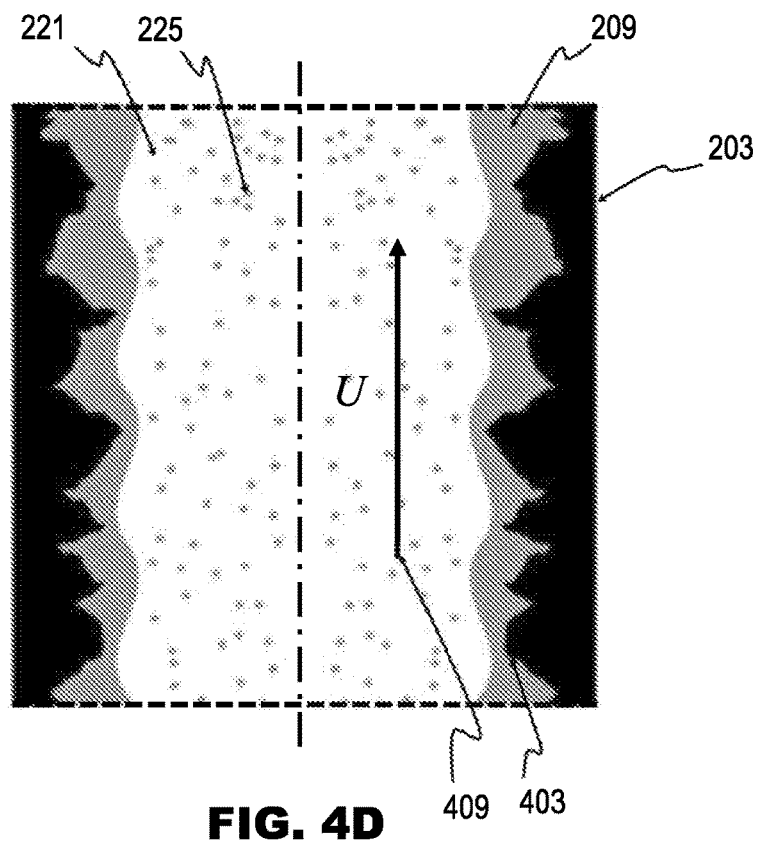
FIG. 4D illustrates an instantaneous cross-sectional side view of a pipe depicting an example of the effective roughness of a thin liquid film in a pipe at high gas velocities, according to some implementations.

We turn now to determining the generic roughness length ($y_0$) for various flows, starting with single phase gas flow. FIGS. 4A-4D depict cross-sectional side views of the long axis of the pipe 203 illustrating examples of conditions at the interior wall of the pipe 203, according to some implementations. FIG. 4A depicts an example of a flow 409 of a single phase liquid 413 in a hydraulic rough flow state (e.g., fast flow) over a rough interior wall 403 of the pipe 203 at microscopic scale. It is understood that the roughness of the interior wall 403 is exaggerated for the sake of illustration. The surface roughness of an interior wall 401 of the pipe 203 can be, for example 50 micrometers. FIG. 4B depicts a flow 409 of a single phase liquid 413 in a hydraulic smooth flow state (e.g., slow flow). In such state, a viscous sublayer 411 may form over the interior wall 403. In FIG. 4B, the of height of the viscous sublayer 411 is time-averaged, such that it appears as a substantially flat layer, which may fail to represent drag (e.g., friction) caused by waviness of the viscous sublayer 411. FIG. 4C depicts a wavy viscous sublayer 411 of the single-phase liquid 413 without time averaging, which better represents the drag of the viscous sublayer 411 than in FIG. 4B. FIG. 4D depicts the wavy viscous liquid film 209 of the pipe 203 in a multiphase mixture 205 with low liquid loading, according to aspects of the present disclosure. Similar to the wavy viscous sublayer 411 of FIG. 4C, the viscous liquid film 209 may cause an effective roughness (e.g., hydraulic roughness) on the interior wall 403 of the pipe 203.

For single-phase hydraulic rough flow 413 (e.g., only gas 221), such as depicted in FIG. 4A, the interior wall 403 of the pipe 203 can be considered to be fully rough if the Reynolds number is large enough so that the friction factor depends on the wall roughness only. The Reynolds number (Re) is a dimensionless quantity used in fluid mechanics. In particular, the Reynolds number is the ratio of inertial forces to viscous forces of a flow. At low Reynolds numbers flow tends to be dominated by viscosity. At high Reynolds numbers turbulence results in fluctuations in the fluid's speed and direction, which may even move counter to the overall direction of the flow.

In accordance with aspects of the present disclosure, the roughness of the interior wall 403 of the pipe 203 depicted in FIG. 4A generates a turbulent form of drag on the flow 409 of the single phase liquid 413. This effect can be represented by a single length scale known as the "equivalent sand grain roughness" ($k_s$). The generic roughness scale ($y_0$) is thus proportional to the sand grain roughness in this case (i.e., $y_0 = c_k k_s$). Taking $c_k = c_0/3.7$, the generic friction law (Equation (7)) becomes the following equation, which is von Kármán's friction law for rough pipes:

$$\frac{1}{\sqrt{\lambda_w}} = -2\log_{10}\left(\frac{k_s}{3.7D}\right). \tag{8}$$

For lower Reynolds numbers, the viscous sublayer 411 covers the roughness of the interior wall 403, which in this case have substantially no effect on the flow 409, as illustrated in FIG. 4B. The flow in the viscous sublayer 411 is independent of the diameter 229 of the pipe 203. Dimensional analysis reveals that flow in the viscous sublayer 411 is characterized by the viscous length scale $\delta_{\mu_g} = v_g/u^*_g$. The generic roughness ($y_0$) is thus proportional to the viscous length scale in this case (i.e., $y_0 = c_{\mu g} \delta_{\mu g}$), and the generic friction law (Equation (7)) becomes the following equation, which is Prandtl's friction law for smooth pipes:

$$\frac{1}{\sqrt{\lambda_w}} = -2\log_{10}\left(\frac{251}{\sqrt{\lambda_w} Re_g}\right) \tag{9}$$

wherein:

$Re_g = U_g D/v_g$, and $c_{\mu g} = 2.51 c_0/\sqrt{8}$.

Thus, the viscous sublayer 411 in FIG. 4C, which is conventionally associated with hydraulic smooth flow, gives rise to an apparent wall roughness. This is because wall shear stress is continually fluctuating in response to the turbulence, which is also the case for the viscous length scale and viscous sublayer thickness. In other words, as depicted in FIG. 4C, the viscous sublayer 411 is wavy, and the turbulent drag on the waves results in an apparent roughness, in a similar way as for hydraulic rough flows, where the wall roughness elements give the turbulent drag. In this sense, a hydraulic smooth flow can be considered to be fully rough. However, in accordance with aspects of the present disclosure, it is understood that the roughness is given by the wavy viscous sublayer 411 and not by the interior wall of the pipe 203. This can be illustrated by considering a balance $E_k = E_\mu$ between the turbulent kinetic energy $E_k \sim \rho_g (u^*_g)^2 h_w^3$ in the vicinity of the interface and the viscous dissipation $E_\mu \sim \mu_g u^*_g h_w^2$ associated with the distortion of the viscous sublayer 411. Solving for the characteristic wave height ($h_w$), which is associated with the roughness scale $y_0$, gives $y_0 \sim \delta_{\mu g}$.

Turning now to FIG. 4D, the flow 409 of the multiphase mixture 205 (e.g., including liquid 221 and gas 225) having the liquid film 209 on the interior wall 403 of the pipe 203 is similar to a single phase hydraulic smooth flow discussed above. The flow in the multiphase mixture 205 (e.g., a gas and oil and water) is in this case fully rough, but subject to the roughness of the viscous liquid film 209, which can be the same or similar to that of the viscous sublayer 411. As with the viscous sublayer 411, it may be assumed that the thickness of the liquid film 209 is independent of the pipe diameter 229. The generic roughness may be associated with wave amplitudes, which may be assumed not to be directly affected by gravity in vertical flow. From dimensional analysis, there are two candidates for the generic roughness scale $y_0$. First, there is the viscous length scale of the liquid film $\delta_{\mu_l} = v_l/u^*_{il}$, where $u^*_{il} = \sqrt{\tau_i/\rho_l}$ and $v_l = \mu_l/\rho_l$. This is analogous to the viscous length scale in single phase flow. Both are based on the shear stress, but the viscous length scale of the liquid film is based on the viscosity and density of the liquid. The corresponding generic film roughness is given by $y_0 = c_{\mu_l} \delta_{\mu_l}$, which in combination with the generic friction law (Equation (7)) gives:

$$\frac{1}{\sqrt{\lambda_{\mu_l}}} = -2\log_{10}\left(\frac{B_{\mu_l}}{\sqrt{\lambda_{\mu_l}} Re_i}\right). \tag{10}$$

The two-phase Reynolds number $Re_i$ is given by:

$$Re_i = \frac{\sqrt{\rho_l \rho_g} U_g D_g}{v_l} \tag{11}$$

wherein:
$\rho_l$ is the density of the liquid 225,
$\rho_g$ is the density of the gas 221,
$U_g$ is the velocity of the gas 221,
$D_g$ is the diameter of the gas in the pipe 203, and
$v_l$ is the kinematic viscosity of the liquid 225.

In the analysis applied so far $B_{\mu_l} = c_{\mu_l} \sqrt{8}/c_0$ is constant. However, as detailed below, $B_{\mu_l}$ can vary based on the liquid superficial velocity $U_{SL}$.

The second characteristic length scale that may be obtained from dimensional analysis is $l_\sigma = \sigma_{gl}/\tau_i$, which represents surface tension forces. In this case, the corresponding generic roughness becomes $y_0 = c_\sigma l_\sigma$, which in combination with Equation (7) gives:

$$\frac{1}{\sqrt{\lambda_\sigma}} = -2\log_{10}\left(\frac{B_\sigma}{\lambda_\sigma We_i}\right) \tag{12}$$

The Weber number $We_i$ is given by:

$$We_i = \frac{D_g \rho_g U_g^2}{\sigma_{gl}} \tag{13}$$

wherein:

$U_g$ is the velocity of the gas 221, $\rho_g$ is the density of the gas-liquid mixture 221, 225 of the multiphase mixture 205, $D_g$ is the diameter of the gas in the pipe 203, and $\sigma_{gl}$ is the surface tension of the gas 211 and liquid 225.

In some cases, $B_\sigma$ can be a constant value (e.g., $B_\sigma=8c_\sigma/c_0$). However, as for $B_{\mu_l}$, $B_\sigma$ can be dependent on the liquid superficial velocity.

The friction factor relations may be solved. To simplify the combination of the different models, the roughness length scale giving the highest roughness is applied. The friction factor is then given by $\lambda_i=\max(\lambda_{\mu_l},\lambda_\sigma)$. The corresponding effective relative roughness $k_E/D$ may be obtained by comparison with von Kármán's friction law (Equation (8)). This gives:

$$\frac{k_E}{D} = 3.7 \cdot \max\left[\frac{B_{\mu_l}}{\sqrt{\lambda_{\mu_l}}\,Re_i},\ \frac{B_\sigma}{\lambda_\sigma We_i}\right] \quad (14)$$

As in the single phase case, a better understanding of the result may be obtained by considering an energy balance $E_k=E_\mu+E_\sigma$, in which the turbulent kinetic energy $E_k\cdot\rho_g$ $(u^*_{ig})^2 h_w^3$ in the vicinity of the interface balances the viscous dissipation and surface energy associated with the distortion of the liquid film, $E_\mu \sim \mu_l u^*_{il} h_w^2$ and $E_\sigma \sim \sigma h_w^2$. The generic roughness may be associated with wave amplitudes perpendicular to the pipe wall, which are assumed not to be directly affected by gravity, which is ignored. Solving for the "wave height" $h_w$, which is associated with the roughness length $y_0$ gives $y_0 \approx c_1\delta_{\mu_l} + c_2\sigma/\tau_i$, indicating also that the viscous and surface tension effects should perhaps be superimposed.

The superficial velocity in the liquid film $U_{SL}^F$ is given by the integral:

$$U_{SL}^F = \frac{1}{\pi R^2} \int_{R-h}^{R} u_L 2\pi r\, dr \quad (15)$$

wherein:

h is film height, r is the radial coordinate,

R is the half the diameter (D) (i.e., R=D/2).

Introducing the linear velocity distribution of a viscous film $u_L \approx \tau_i/\mu_L$ and integrating gives:

$$U_{SL}^F = \frac{2D\tau_i}{\mu_L}\left(1 - \frac{4}{3}\frac{h}{D}\right)\left(\frac{h}{D}\right)^2 \quad (16)$$

The maximum film height $h_{max}$ is obtained when all of the liquid is in the film. Neglecting higher order terms in $h_{max}/D \ll 1$ and reformulating gives:

$$h_{max} \approx \sqrt{\frac{Re_l}{2}}\,\delta_{\mu_l} \quad (17)$$

Hence, the maximum film height is proportional to the viscous length scale of the liquid film $\delta_{\mu_l}=v_l/u^*_{il}$. The proportionality depends on the Reynolds number $Re_l=U_{SL}D/v_l$, based on the total liquid superficial velocity $U_{SL}$. For a thick liquid layer there is no direct relation between the layer height and its surface roughness. However, for a thin film, the layer height restricts the roughness. It may therefore be assumed that the roughness is given by $y_0=c_{max}h_{max}$ where $c_{max}$ is a constant. Applying this relation in the generic friction law (Equation (7)), arrives at equation (10). Now, however, there is:

$$B_{\mu_l} = C_{\mu_l}\sqrt{Re_l} \quad (18)$$

Equation 18 accounts for variations in the liquid flow rate. In accordance with implementations, the value of $C_{\mu_l}$ may be approximately 0.14.

To account for the liquid flow rate in the surface tension dominated friction (Equation (11)), the following correlation may be applied:

$$B_\sigma = C_\sigma\sqrt{\alpha Re_l} \quad (19)$$

wherein:

$\alpha=\sqrt{U_{SL}/U_{SG}}$, and $C_\sigma \approx 0.013$.

This expression is a generalization of Equation (18), which gives a better match to the subset of the experimental data which have surface tension dominated roughness.

The entrainment of liquid droplets into the gas core is a secondary effect in the low liquid loading flow that is being considering here. A model of the entrainment can be based on the assumption that the scaled film height $y^+=u^*_{il}h/v_L$ remains approximately constant after the onset of entrainment, that is $y^+ \approx C_+$, where we the value of $C_+$ may be 50. Combining this with Equation (16), the following expression for the superficial velocity of the liquid film may be obtained:

$$U_{SL}^F \approx \min\left[U_{SL},\ 2C_+^2\frac{v_L}{D}\right] \quad (20)$$

The above equation has been limited upwards by the total available liquid superficial velocity $U_{SL}$. The liquid which is not in the film may travel as liquid droplets in the gas core, with superficial velocity given by:

$$U_{SL}^g = U_{SL} - U_{SL}^F \quad (21)$$

Knowing the liquid superficial velocities of the gas core and thin film allows determination of the liquid fraction in the gas core and the gas core density (Equations (2) and (3)).

In experiments carried out in a 50 meter high, 4 inch diameter vertical riser, fluids used were nitrogen at 40 bar, Exxsol D60 and water. Some useful measurements were of pressure gradient, chordal liquid holdup estimates were also obtained using narrow beam gamma densitometers, but the measured values were of the same order as the measured uncertainty, and thus are of attenuated value. No measurements of entrained fraction were attempted.

Figure 5A:
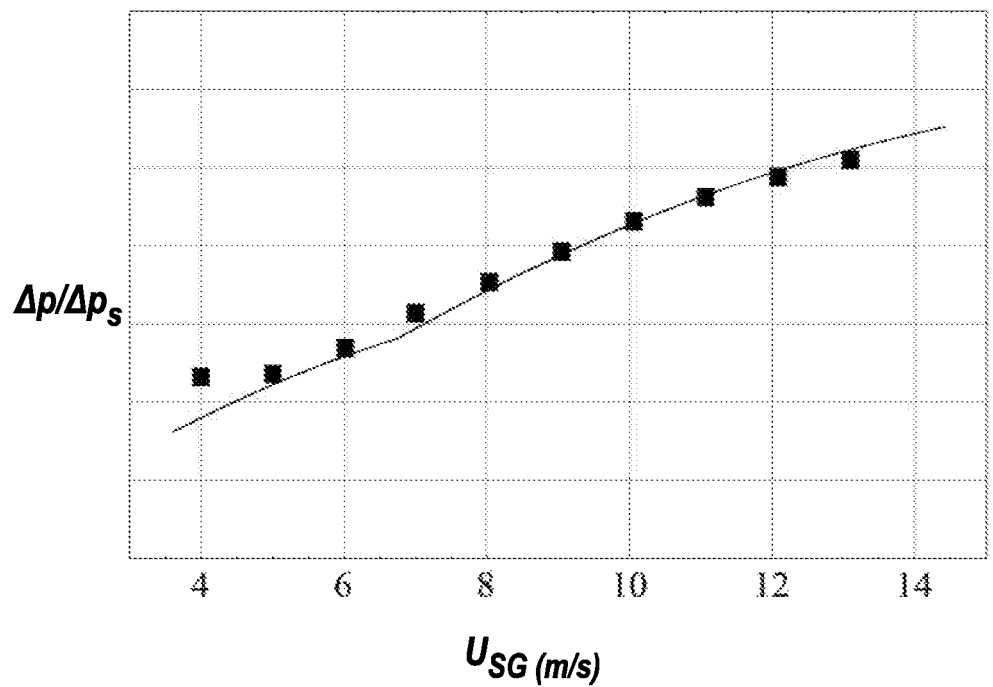
FIG. 5A illustrates a graph showing a comparison of the model predictions with data from nitrogen-Exxsol experiments, according to some implementations.
Figure 5B:
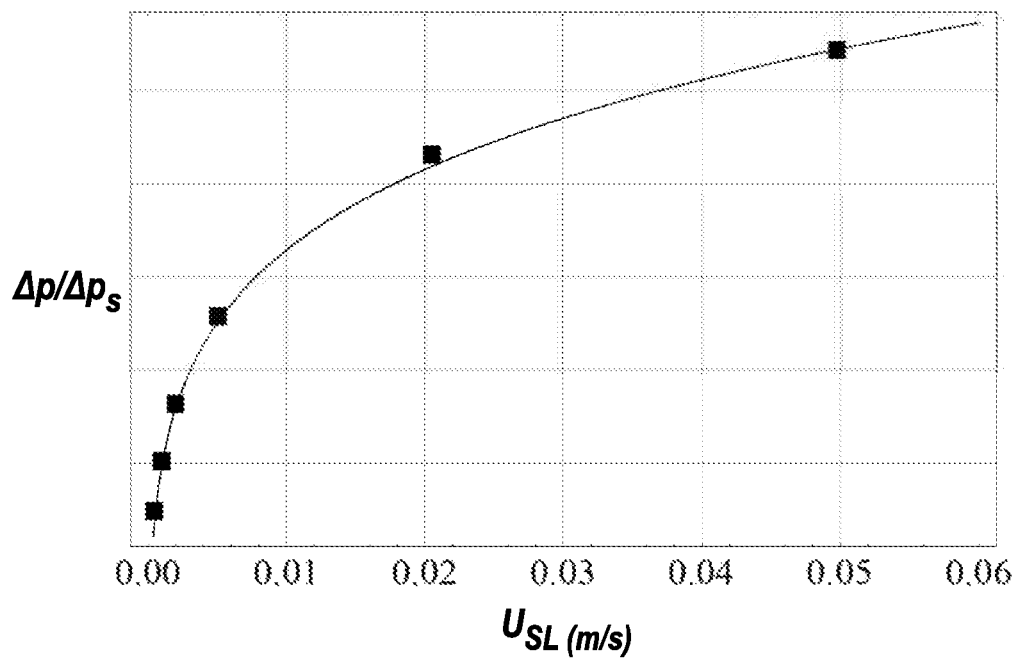
FIG. 5B illustrates a graph showing a comparison of the model predictions with data from nitrogen-Exxsol experiments, according to some implementations.
Figure 5C:
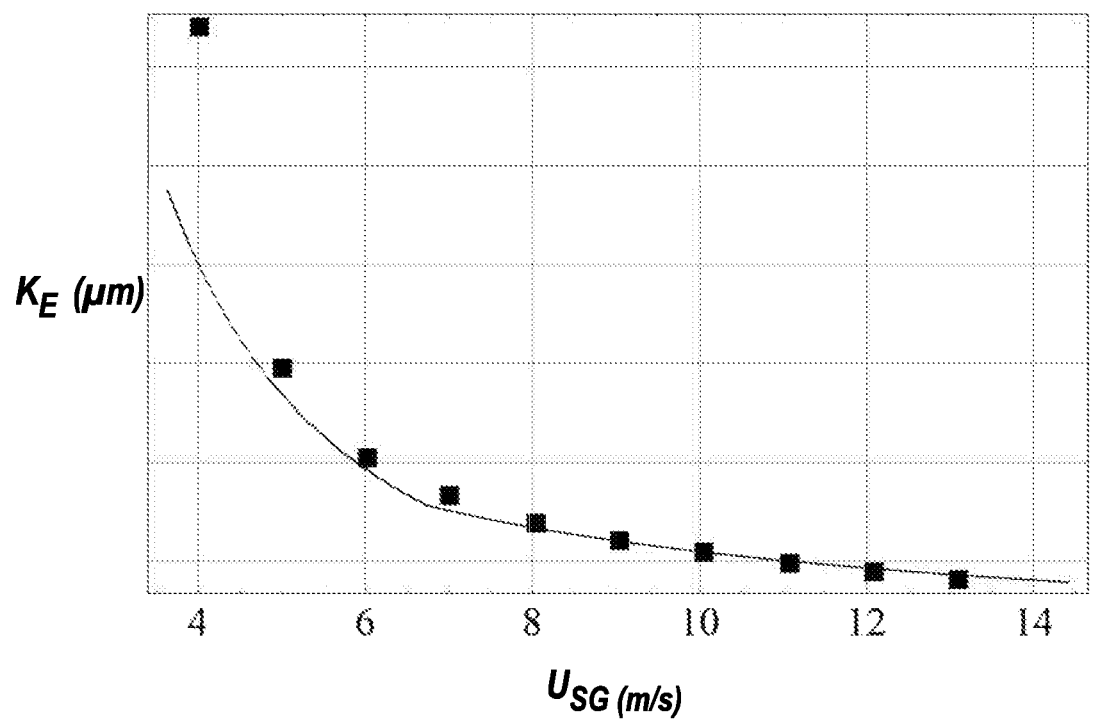
FIG. 5C illustrates a graph showing a comparison of the model predictions with data from nitrogen-Exxsol experiments, according to some implementations.
Figure 5D:
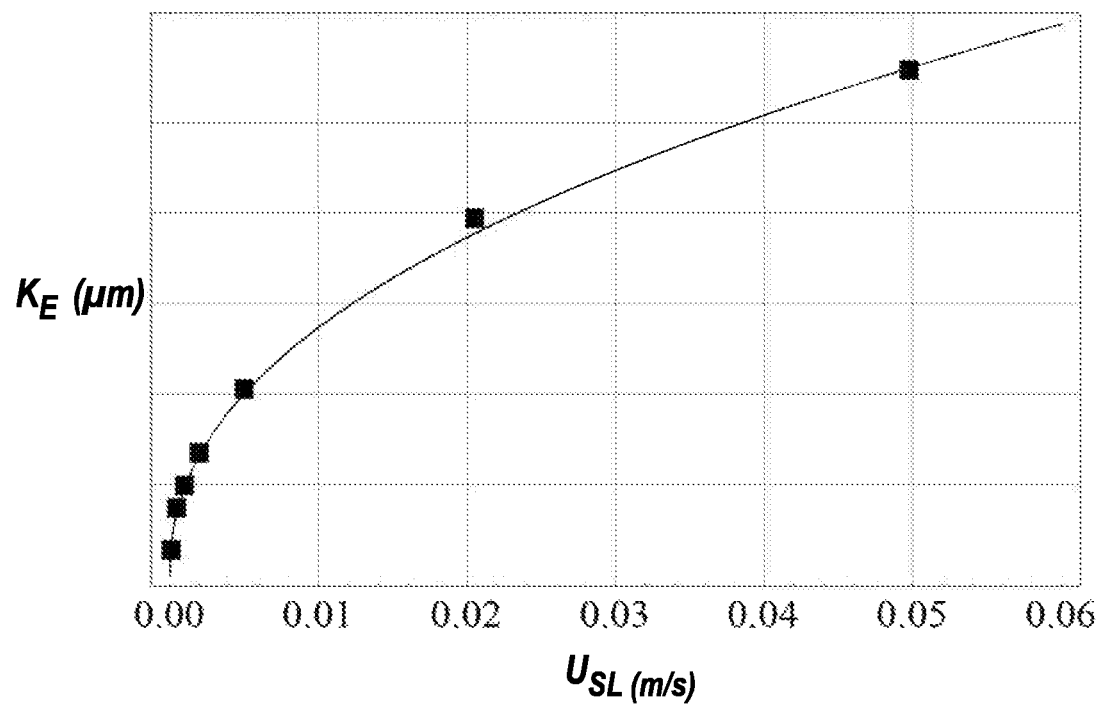
FIG. 5D illustrates a graph showing a comparison of the model predictions with data from nitrogen-Exxsol experiments, according to some implementations.

FIGS. 5A-5D are graphs showing a comparison of the model predictions with data from nitrogen-Exxsol experiments, according to some implementations. More particularly, FIGS. 5A-5D show results for two-phase nitrogen-Exxsol flows. The squares represent the measurements. Full drawn lines are the model predictions based on nominal values. The plots of FIGS. 5A and 5C show the variation with gas superficial velocity for a constant liquid superficial velocity $U_{SL}=0.01$ m/s. The plots of FIGS. 5B and 5D respectively show the variation with liquid superficial velocity for a constant gas superficial velocity $U_{SG}=10$ m/s FIGS. 5A and 5B show the total pressure drop Op (including gravitational and frictional contributions) scaled by the corresponding single phase pressure drop $\Delta p_s$. FIGS. 5C and 5D show the corresponding effective roughness ($k_E$) in microns.

The effective roughness decreases as the gas superficial velocity increases. However, the pressure drop increases with respect to the single phase pressure drop, since the frictional contribution becomes larger at high flow rates. In FIGS. 5B and 5D, it may be seen how pressure drop and effective roughness approach the single phase values as the liquid flow rate goes to zero. The agreement with the data is seen to be quite good. For the nitrogen-Exxsol data, it was found that the liquid film was mainly dominated by viscosity, but surface tension effects became important for $U_{SG} < 7$ m/s.

The scaled maximum film thickness $y^+ = u^*_i h_{max}/v_L$ obtained from the measured holdup and pressure drop was mainly below 30, indicating that the Exxsol film was mainly viscous, in agreement with the premises of the model.

Figure 6A:
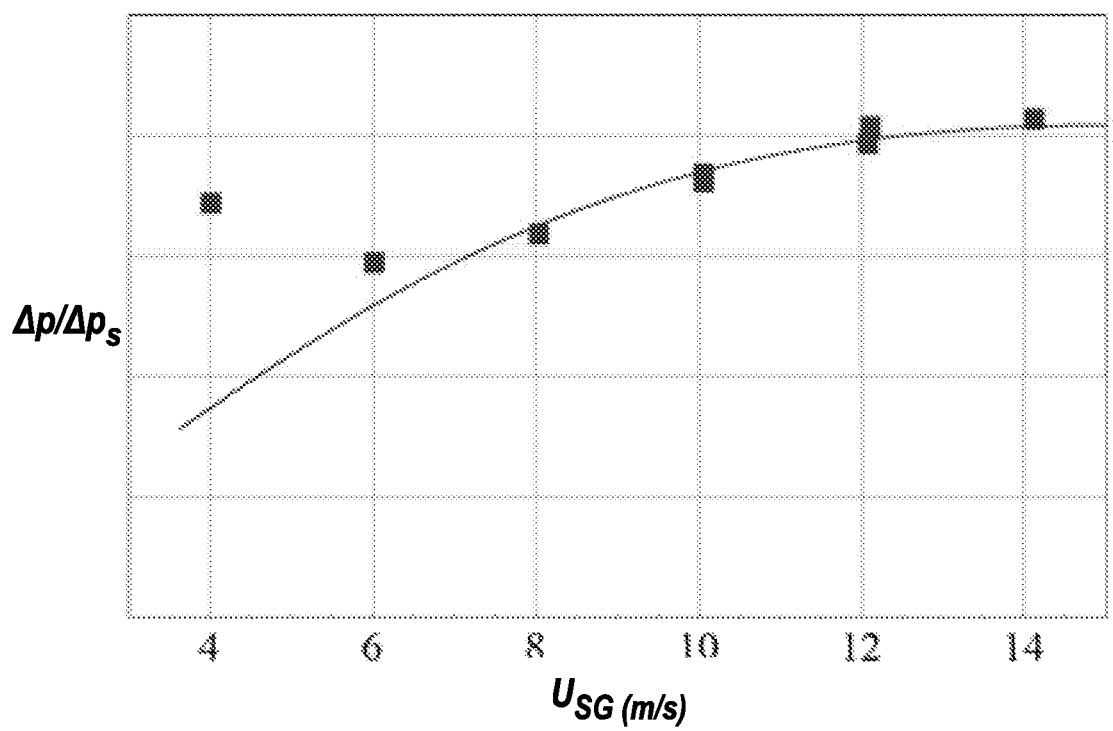
FIG. 6A illustrates a graph showing results for nitrogen-water data corresponding to the nitrogen-Exxsol data in FIGS. 5A, according to some implementations.
Figure 6B:
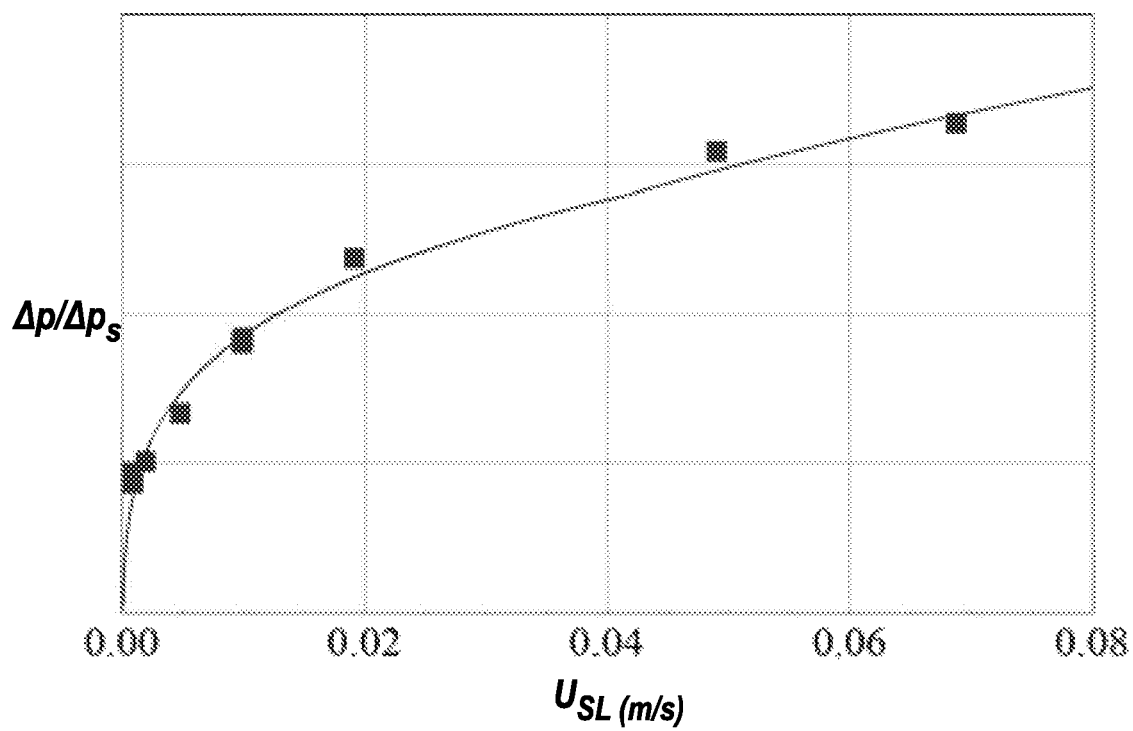
FIG. 6B illustrates a graph showing results for nitrogen-water data corresponding to the nitrogen-Exxsol data in FIGS. 5B, according to some implementations.
Figure 6C:
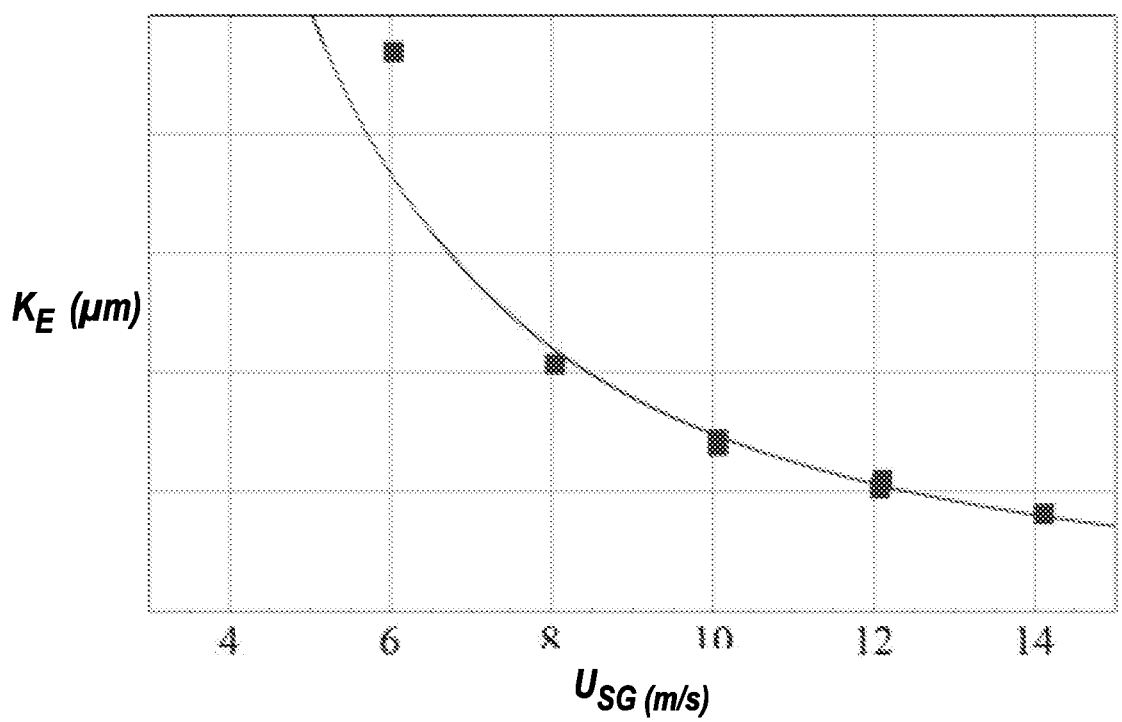
FIG. 6C illustrates a graph showing results for nitrogen-water data corresponding to the nitrogen-Exxsol data in FIGS. 5C, according to some implementations.
Figure 6D:
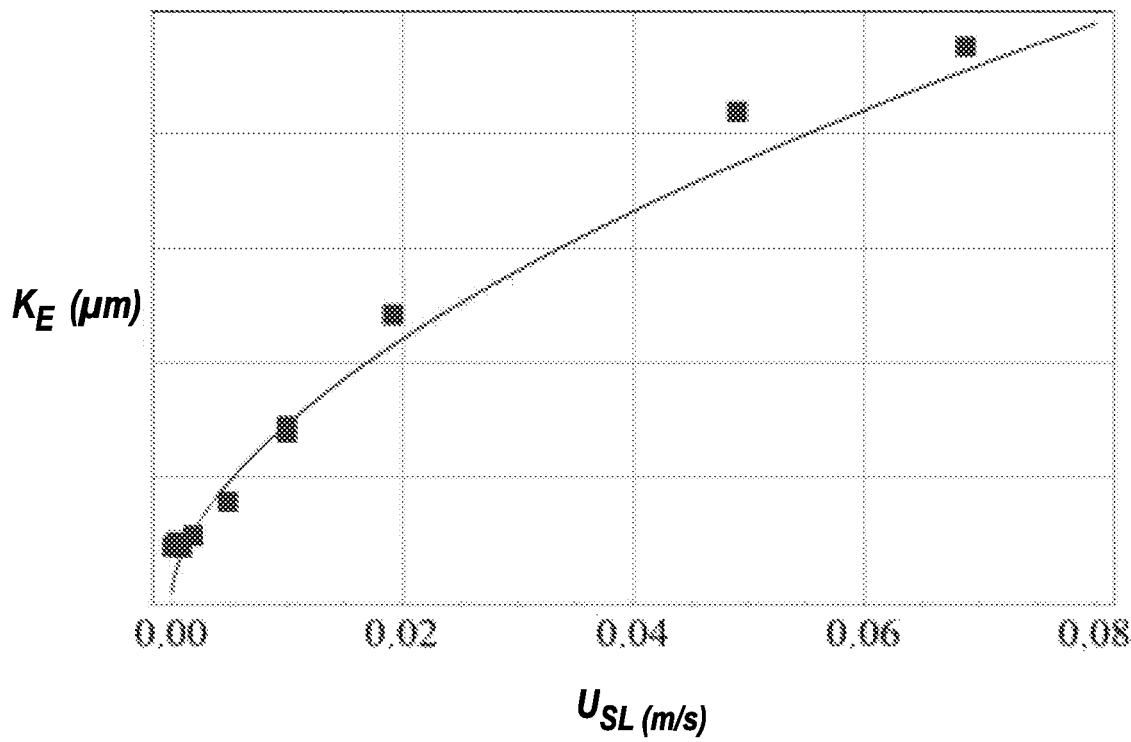
FIG. 6D illustrates a graph showing results for nitrogen-water data corresponding to the nitrogen-Exxsol data in FIGS. 5D, according to some implementations.

FIGS. 6A-6D are graphs showing results for nitrogen-water data corresponding to the nitrogen-Exxsol data in FIGS. 5A-5D, according to some implementations. More particularly FIGS. 6A-6D show the results for two-phase nitrogen-water flows. The squares represent the measurements. Full drawn lines are the model predictions based on nominal values. The plots of FIGS. 6A and 6C show variation with $U_{SG}$ for $U_{SL}=0.01$ m/s. The plots of FIGS. 6B and 6D respectively show variation with $U_{SL}$ for $U_{SG}=10$ m/s. FIGS. 6A and 6B show pressure drop predictions ($\Delta p$) scaled by the corresponding single phase pressure drop ($\Delta p_s$). FIGS. 6C and 6D show effective roughness ($k_E$). For these data, the apparent film roughness was dominated by the surface tension.

The under-prediction of pressure drop and effective roughness for $U_{SG} < 6$ m/s is likely to be caused by gravity effects not accounted for in the model. Gravity effects are less pronounced in the nitrogen-Exxsol data due to the thinner liquid films. The predictions for the higher gas velocities are, nevertheless, quite good.

It was found that the scaled maximum film thickness $y^+ = u^*_i h_{max}/v_L$ obtained from the data was between 40 and 70 for $U_{SL}=0.01$ m/s, indicating that the water film was at least partially turbulent.

The examples discussed above model two phase flow (e.g., including gas and either water or oil). Models of three-phase flows (e.g., oil, water, and gas) can be much more complex because it is difficult to make a fully mechanistic model without detailed information about the distribution and conformation of the oil and water within the liquid film. Nevertheless, the above-described model may be extended to provide an approximate description of three-phase flow by considering an equivalent two-phase flow, in which the liquid film includes an oil-water mixture with apparent properties based on simple mixture models. In accordance with aspects of the present disclosure, it is assumed that there is no slip between the oil and water so that the water fraction $\omega_A$ is given by:

$$\omega_A = \frac{U_{SA}}{U_{SH} + U_{SA}} \quad (22)$$

wherein, $U_{SH}$ and $U_{SA}$ are the oil and water superficial velocities.

The corresponding liquid density is:

$$\rho_l = \omega_H \rho_H + \omega_A \rho_A \quad (23)$$

wherein:

$\rho_H$ and $\rho_A$ are the phase densities of oil and water, and $\omega_H = 1 - \omega_A$ is the oil fraction.

The liquid layer emulsion viscosity may be modelled using the following equation:

$$\mu_l = [(\mu_{Ah})^{-2} + (\mu_{Ha})^{-2}]^{-1/2} \quad (24)$$

Equation (24) provides a blending between the emulsion viscosities for oil-continuous and water-continuous films, where $\mu_{Ah}$ represents the viscosity of a water-in-oil emulsion and $\mu_{Ha}$ represents the viscosity of an oil-in-water emulsion at the same water fraction. The Pal and Rhodes model may be applied for the emulsion viscosities, with dispersed phase concentration for which the relative viscosity is 100 set to, for example, 0.5 and 0.75 for oil-continuous and water-continuous liquid films respectively. The blending applied in the emulsion viscosity model (Equation (24)) is equivalent to setting the inversion point at the crossing point of the emulsion viscosities for oil-continuous and water-continuous dispersions, as shown in FIGS. 7A and 7B.

Figure 7A:
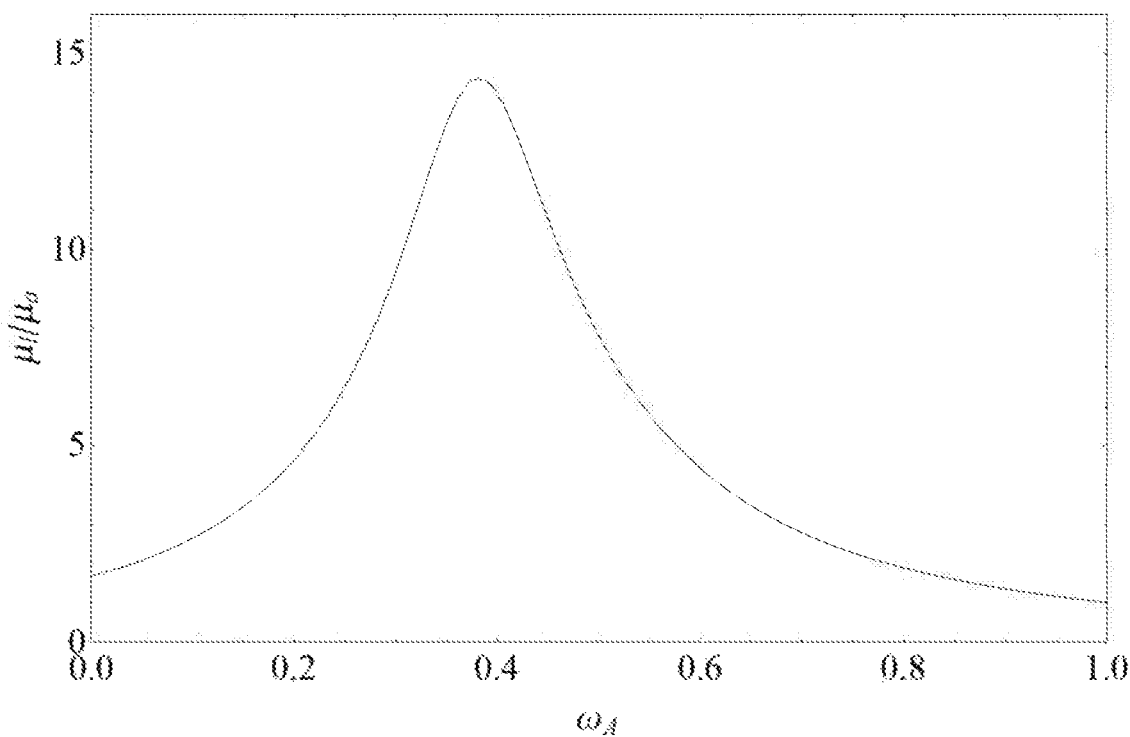
FIG. 7A illustrates a graph depicting an example of predicted effective viscosity of an emulsion, according to some implementations.
Figure 7B:
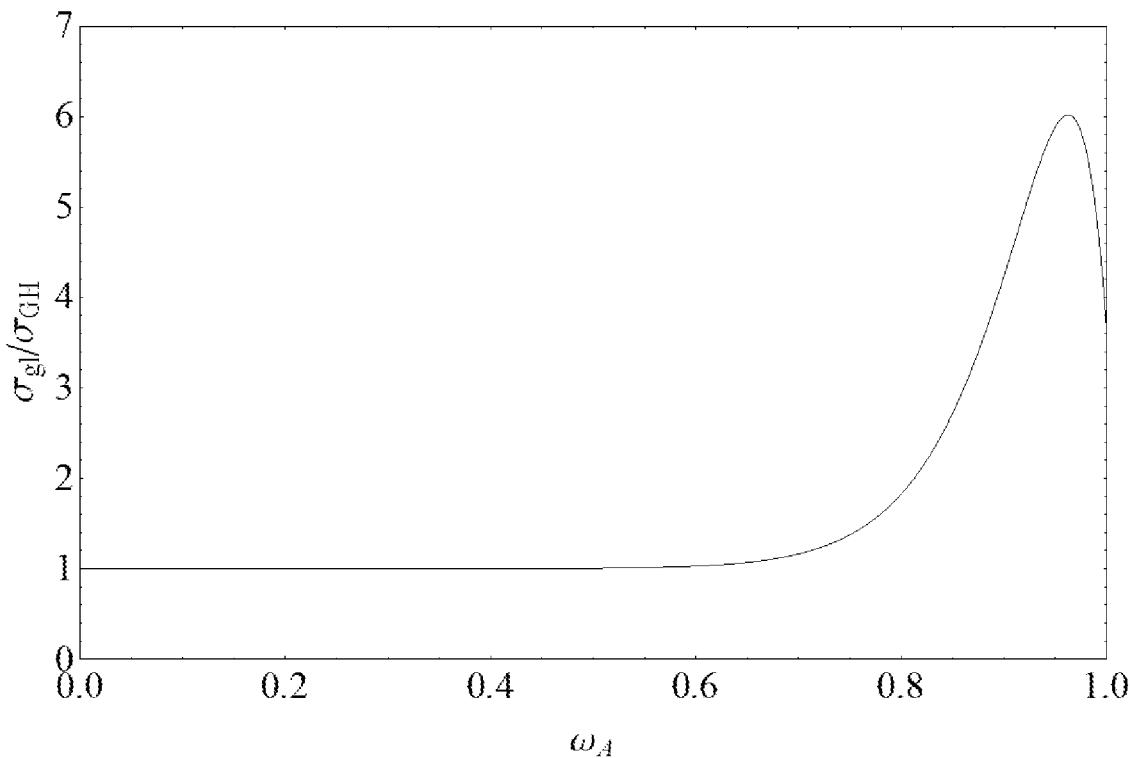
FIG. 7B illustrates a graph depicting predicted effective surface tension of an emulsion, according to some implementations.

FIGS. 7A and 7B illustrate the emulsion viscosity given by Equation (24) and the surface tension given by Equation (25), respectively, according to some implementations. In order to model the apparent surface tension of the liquid film, the values of interfacial tension corresponding to the three fluid pairs, $\sigma_{GH}$, $\sigma_{GA}$, and $\sigma_{HA}$, may be considered where G is gas, H is oil, and A is water. When the values representative of the clean fluids are considered, it may be the case that $\sigma_{GA} > \sigma_{HA} + \sigma_{GH}$. In the case of an oil-continuous film, this means that water droplets within the interface are unstable, and will be ejected into the bulk of the film, or into the gas core. In this case, the gas/liquid layer surface tension is given by the gas/oil surface tension, $\sigma_{gl} = \sigma_{GH}$ In contrast, for a water-continuous film, oil droplets within the interface will tend to spread over the entire surface of the film, and new oil droplets arriving at the interface will be held there, increasing the thickness of the interfacial oil layer. So, on average, the liquid film is likely to have a two-layer structure: a water, or water-continuous, layer in contact with the pipe wall, with a very thin oil layer at the gas-liquid interface. The interfacial oil layer reduces the interfacial energy, so that as the oil layer gets thicker, the apparent interfacial tension reduces from the value for water, $\sigma_{GA}$, to the value for oil $\sigma_{GH}$. Here, a simple exponentially decaying function of the oil fraction may be applied.

Surface tension is a property of a static interface, while the interfaces under discussion are highly dynamic, with turbulence, waves, and droplet entrainment and deposition processes. These dynamic events continually change the thickness of the interfacial oil layer, and the distribution of surface energy, leading to an apparent surface elasticity. The surface elasticity is an additional effect over and above surface tension, which is caused by the non-equilibrium distribution of the fluids and is evident in dynamic flows. However, it has the same dimensions as surface tension and the same order of magnitude, so that it can be lumped together with surface tension in the present analysis. The surface elasticity is modelled by a linear increase for small values of the oil fraction followed by an exponential decay at larger values.

In summary, when the liquid film is water-continuous, the net effect of surface tension and surface elasticity is modelled as:

$$\sigma_{gl,A} = \sigma_{GH} + (\sigma_{GA} - \sigma_{GH})(1 + ck\omega_H)e^{-k\omega_H} \quad (25)$$

wherein:

k may be taken to be 20, and c is the surface elasticity, which may be taken to be 4.

The form of Equation (25) and the values used for the parameters allow the equation to be used across the whole range of oil and water fractions, as shown in FIG. 7B.

Figure 8A:
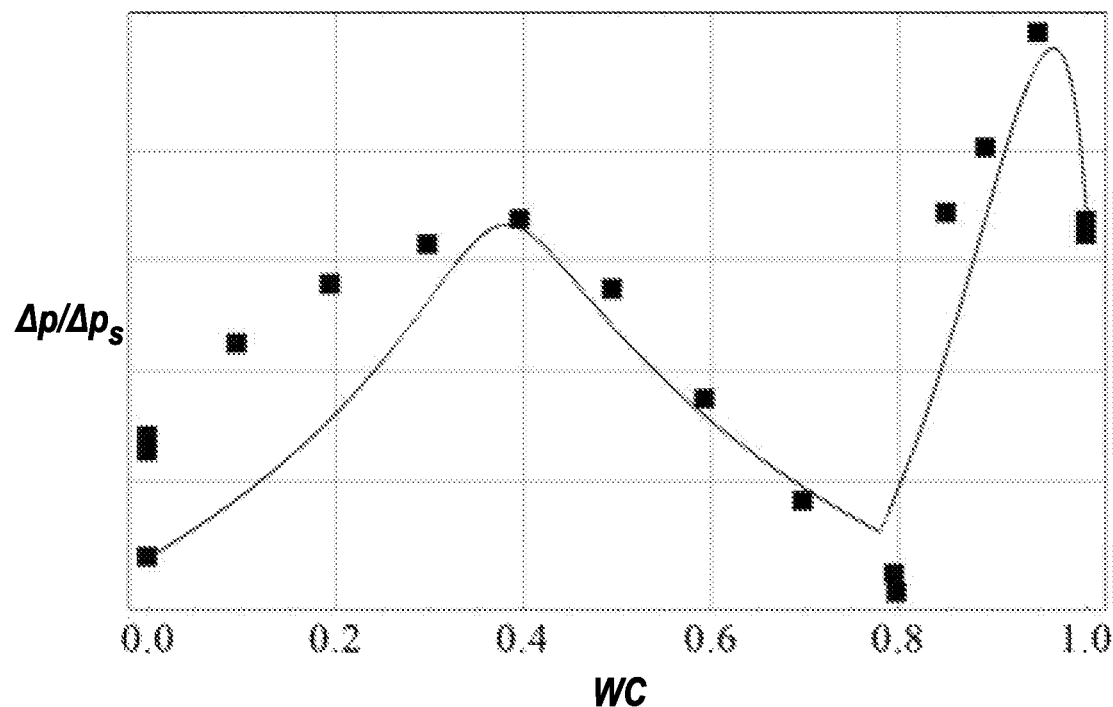
FIG. 8A illustrates a graph depicting an example of predicted pressure drop and an example of actual pressure drop, according to some implementations.
Figure 8B:
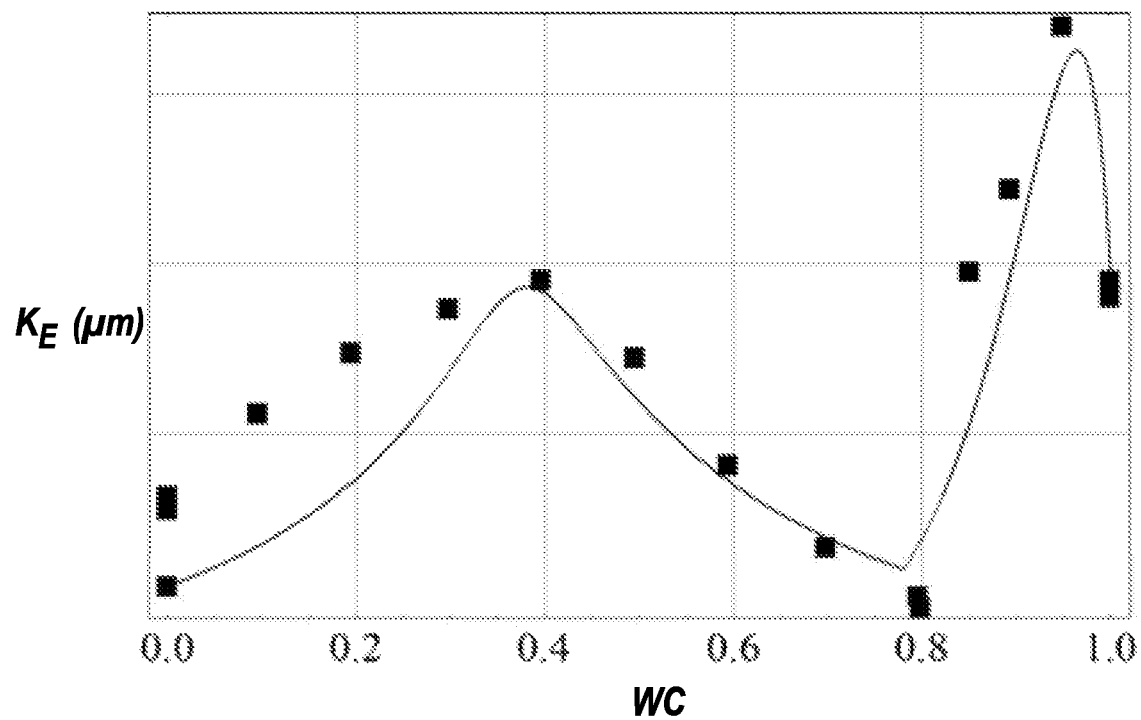
FIG. 8B illustrates a graph depicting an example of predicted effective roughness and an example of actual roughness, according to some implementations.

Here, the model predictions for the pressure drop and apparent roughness are compared with the three-phase nitrogen/Exxsol/water data. FIG. 8A shows the pressure drop $\Delta p$ scaled by the corresponding single phase value $\Delta p_s$ plotted against water cut, with gas and total liquid superficial velocities held constant, $U_{SG}=10$ m/s, $U_{SL}=U_{SH}+U_{SA}=0.1$ m/s. FIG. 8B shows the corresponding effective roughness ($k_E$). The measured effective roughness was back-calculated from the measured pressure drop in the same way as for the two-phase data.

Even though the extension of the two-phase model to three-phase flow is highly simplified, it may be seen that the inclusion of reasonable models for mixture viscosity and surface tension allows the user to predict the main features of the data, including the two distinct maxima around water cut of 0.4 and 0.9, and the minimum at water cut around 0.8. The position of the minimum corresponds to the transition between viscosity-dominated and surface tension dominated roughness, so that the maximum at water cut around 0.4 is attributed to an increased effective viscosity of the liquid film, and the maximum at water cut around 0.9 is attributed to the combined effects of surface tension and surface elasticity.

Figure 9:
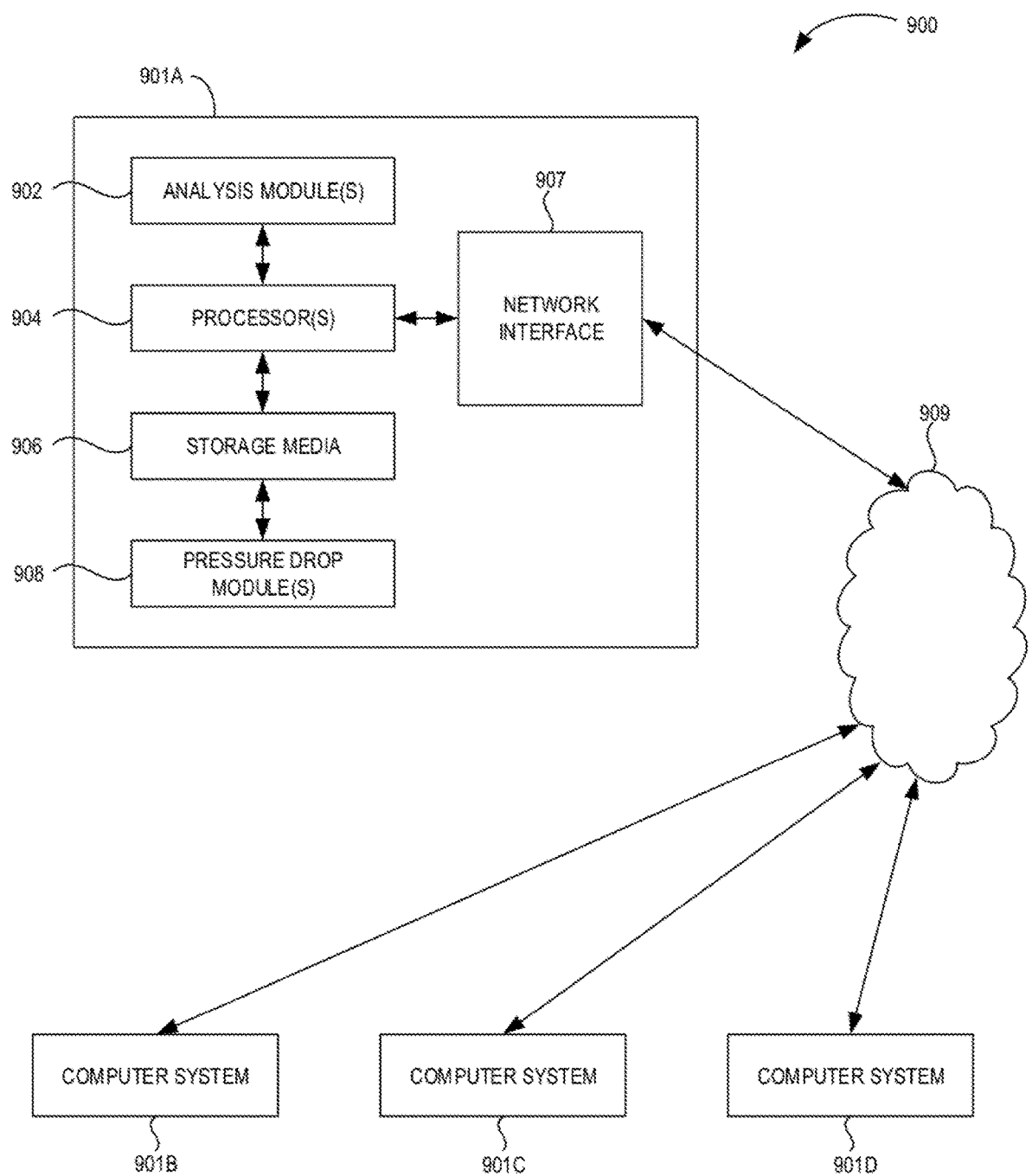
FIG. 9 illustrates a schematic view depicting an example of a computing system, according to some implementations.

FIG. 9 illustrates an example of a computing system 900, in accordance with some implementations. The computing system 900 may include a computer or computer system 901A, which may be an individual computer system 901A or an arrangement of distributed computer systems. The computer system 901A includes one or more analysis module(s) 902 configured to perform various tasks according to some implementations, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor can include a microprocessor, microcontroller, processor module or subsystem, programmable integrated circuit, programmable gate array, or another control or computing device.

The storage media 906 can be implemented as one or more computer-readable or machine-readable storage media. Note that while in the example embodiment of FIG. 9 storage media 906 is depicted as within computer system 901A, in some implementations, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some implementations, computing system 900 contains one or more pressure drop module(s) 908. In the example of computing system 900, computer system 901A includes the pressure drop module 908. In some implementations, a single pressure drop module may be used to perform at least some aspects of one or more implementations of the methods. In other implementations, a plurality of pressure drop modules may be used to perform at least some aspects of the methods.

It should be appreciated that computing system 900 is one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

The flow diagrams in FIGS. 10, 11A, 11B, and 11C illustrate examples of the functionality and operation of possible implementations of systems, methods, and computer program products according to various implementations consistent with the present disclosure. Each block in the flow diagrams of FIGS. 10, 11A, 11B, and 11C can represent a module, segment, or portion of program instructions, which includes one or more computer executable instructions for implementing the illustrated functions and operations. In some alternative implementations, the functions and/or operations illustrated in a particular block of the flow diagrams can occur out of the order shown in FIGS. 10, 11A, 11B, and 11C. For example, two blocks shown in succession can be executed substantially concurrently, or the blocks can sometimes be executed in the reverse order, depending upon the functionality involved. It will also be noted that each block of the flow diagrams and combinations of blocks in the block can be implemented by special purpose hardware-based systems that perform the specified functions or acts, or combinations of special purpose hardware and computer instructions.

Figure 10:
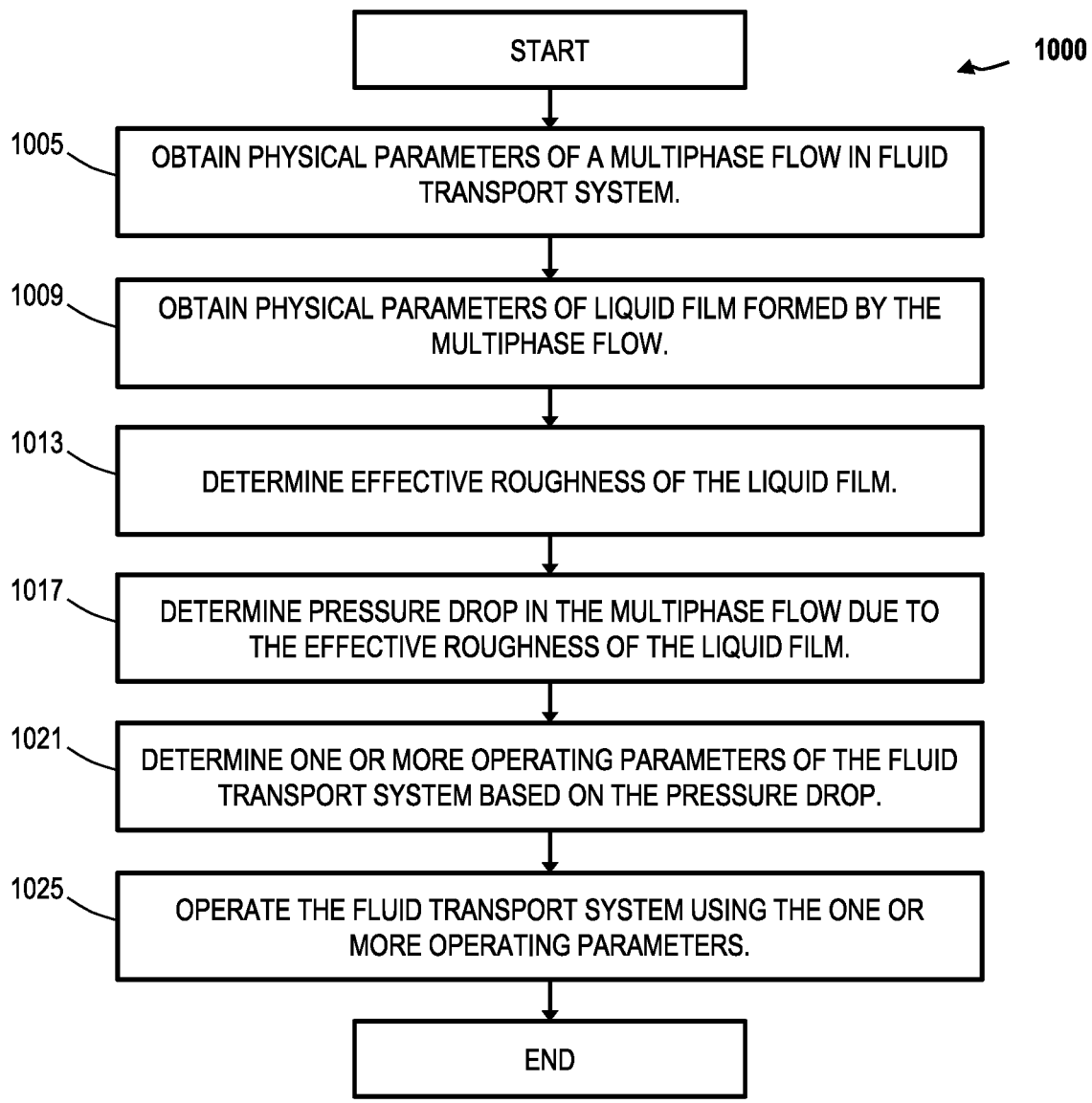
FIG. 10 illustrates a functional flow diagram depicting an example of a process, according to some implementations.

FIG. 10 provides a functional flow diagram illustrating an example of a process 1000 that may be performed by a system (e.g., computing system 901A, including analysis module(s) 902 and pressure drop module(s) 908) in accordance with some implementations. At 1005, the system can obtain physical parameters of a multiphase flow (e.g., multiphase mixture 205) in a fluid transport system (e.g., pipeline environment 150). At 1009, the system can obtain physical parameters of a liquid film formed by the multiphase flow. The physical parameters of 1005 and 1009 can be obtained from various sources (e.g., additional information component 114, entities 122, and attribute component 130, and feedback 160 from the pipeline environment 150). At 1013, the system can determine an effective roughness of the liquid film as previously disclosed herein. For example, using Equations 14, 18 and 19 above, the system can determine the effective roughness $k_E$ using some or all of the physical parameters obtained at 1005 and 1009. At 1017, the system can determine a pressure drop in the multiphase flow influenced by to the effective roughness determined at 1013. For example, using Equation 1, the system can determine a pressure gradient (e.g., Pa/m) for the effective roughness determined at 1013 and some of the physical parameters obtained at 1005 and 1009. At 1021, the system can determine one or more operating parameters of the fluid transport system based on the pressure drop determined at 1017. For example, the system can determine pressures, flow rates, and pipe dimensions for a pipeline environment. At 1025, the system can operate the fluid transport system using the one or more operating parameters determined at 1021.

Figure 11A:
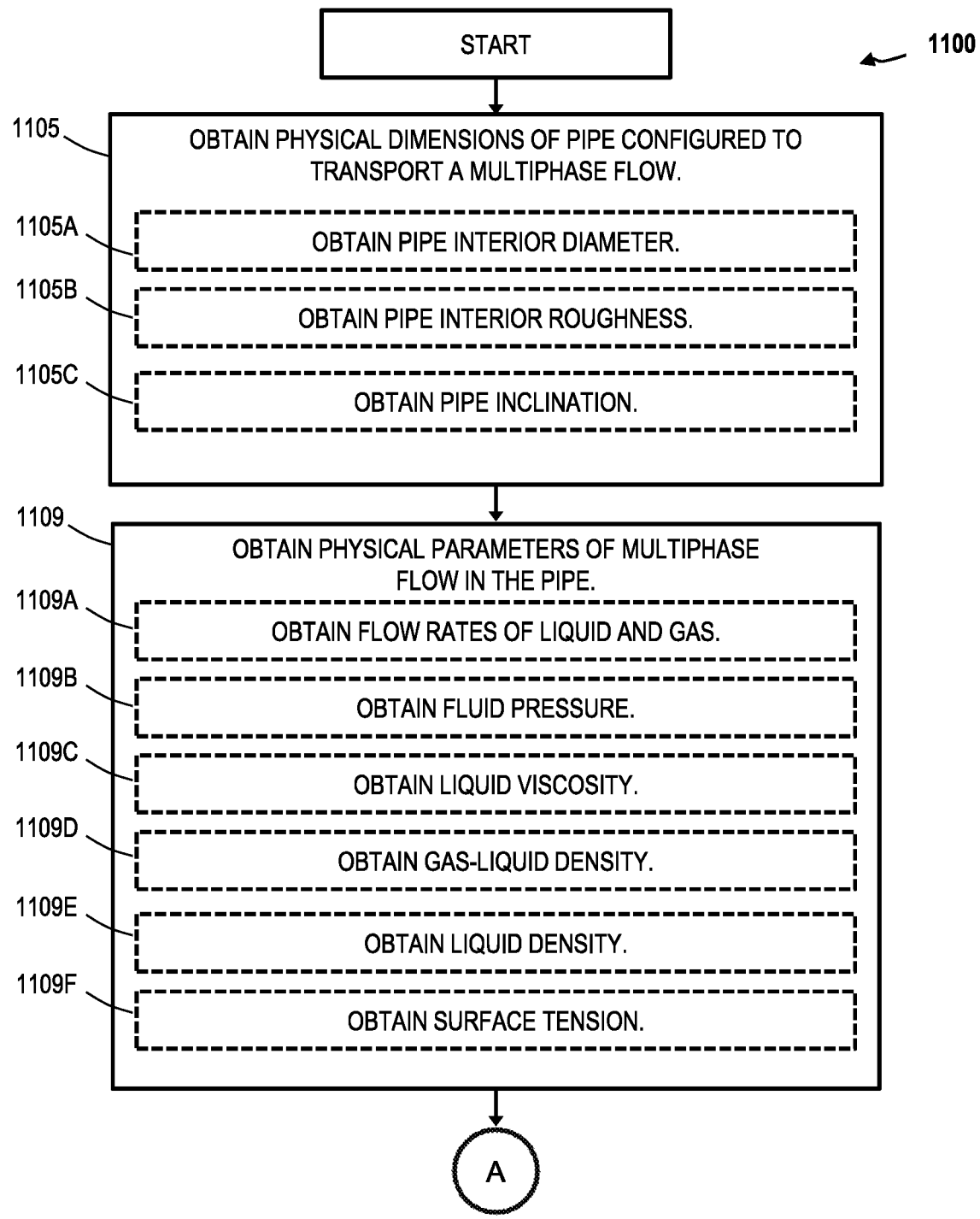
FIG. 11A illustrates a functional flow diagram depicting an example of a process, according to some implementations.
Figure 11B:
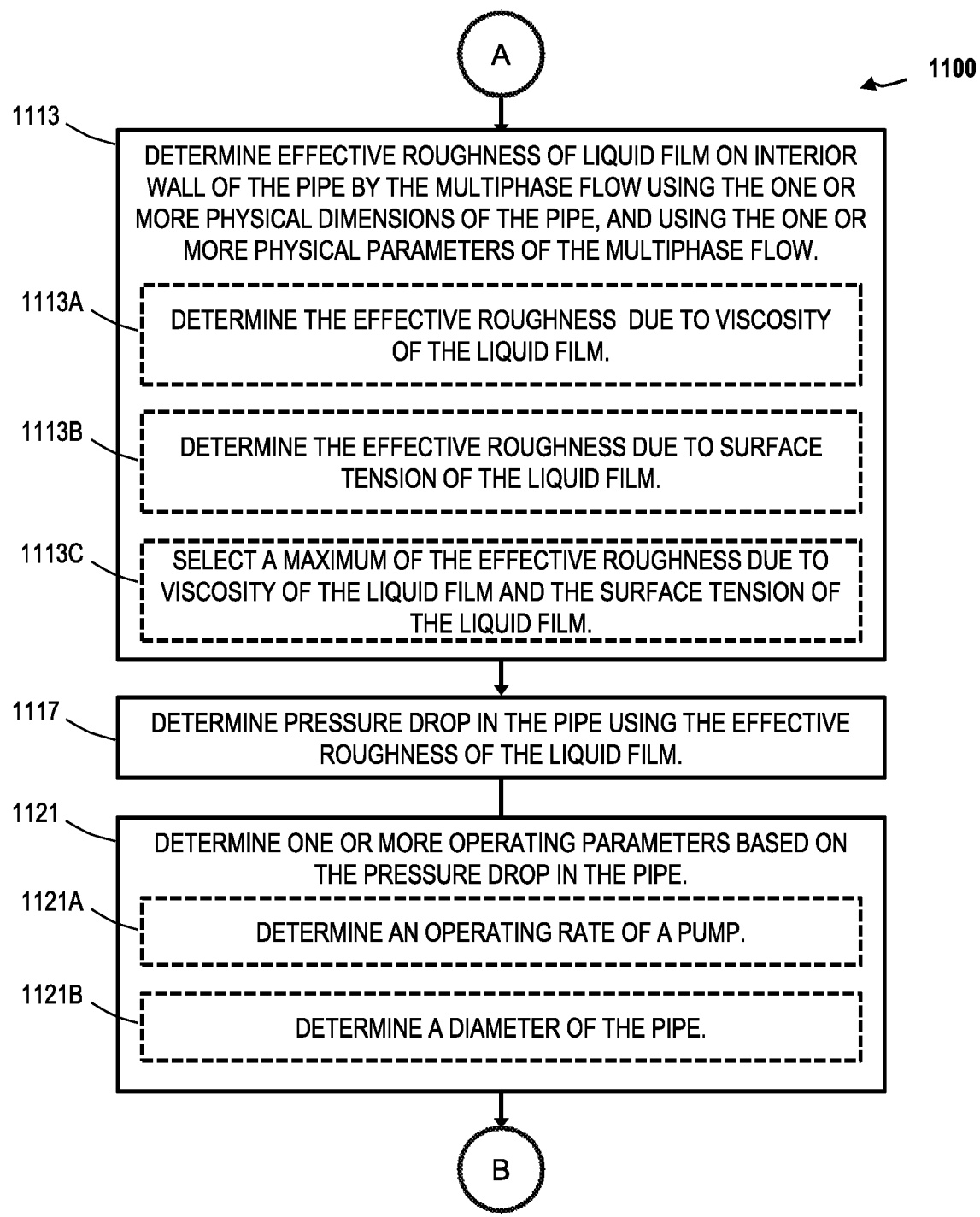
FIG. 11B illustrates a functional flow diagram depicting an example of a process, according to some implementations.
Figure 11C:
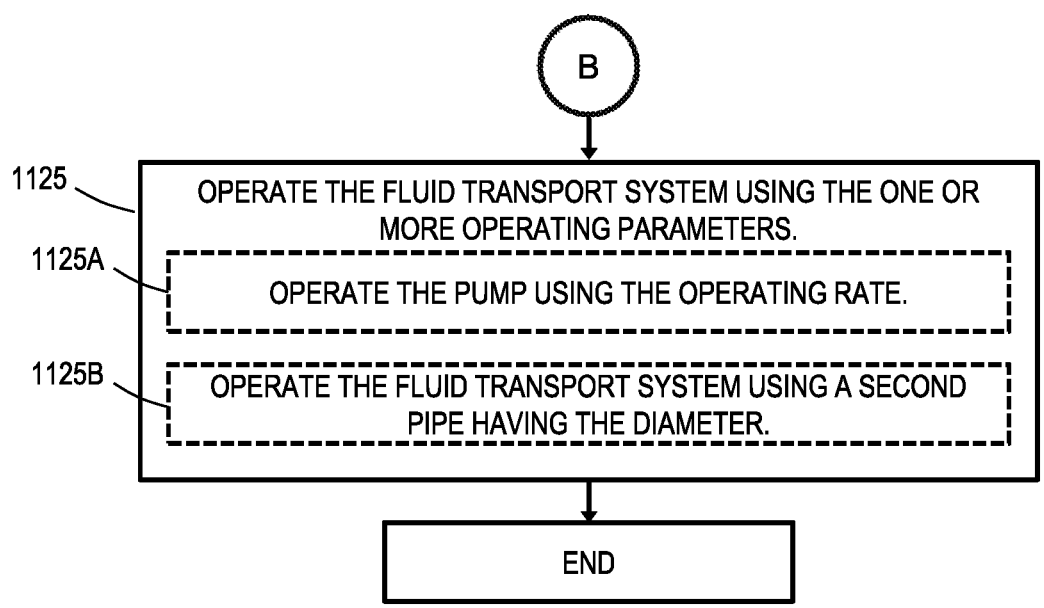
FIG. 11C illustrates a functional flow diagram depicting an example of a process, according to some implementations.

FIGS. 11A, 11B, and 11C provide a functional flow diagram illustrating an example of a process 1100 that may be performed by a system (e.g., computing system 901A, including analysis module(s) 902 and pressure drop module(s) 908) in accordance with some implementations. At 1105, the system can obtain physical dimensions of a pipe included in a fluid transport system. (See, e.g., FIG. 10, 1005.) The fluid transport system can be a pipeline, such as previously described herein (e.g., pipeline environment 150), wherein the physical dimensions can represent the dimensions of a pipe section in the pipeline (e.g. pipeline 156). In some implementations, obtaining the physical dimensions includes, at 1105A, obtaining an interior diameter (D) of the pipe. In some implementations, obtaining the physical dimensions includes, at 1105B, obtaining an interior wall roughness ($k_s$) of the pipe. In some implementations, obtaining the physical dimensions includes, at 1105C, obtaining an inclination of the pipe. The physical dimensions can be obtained from information pre-stored by the system (e.g. as other information 114). For example, the physical dimensions can be information describing an existing pipeline. In other implementations, the physical dimensions can be obtained from a user (e.g. a geophysicist, a geologist, a pipeline engineer, and a reservoir engineer) as in input that represents a potential element of a current or future fluid transport system (e.g., pipeline environment).

At 1109, the system can obtain one or more physical parameters of a multiphase flow in the pipe of 1105. (See, e.g., FIG. 10, 1009.) The multiphase flow can be the same or similar to that previously described herein (e.g., multiphase mixture 205). In some implementations, the multiphase flow can be a two-phase mixture, including only gas (e.g., gas 221) and liquid (e.g., droplets of water 225.) In some implementations, the multiphase flow can be a three-phase mixture, including gas, oil, and water. In some implementations, obtaining the physical parameters of the multiphase flow includes, at 1109A, obtaining flow rates of the multiphase flow, including the liquid and gas. For example, the flow rates can be used to determine superficial velocities of the liquid and gas ($U_{SL}{}^g$, $U_{SG}$). In some implementations, obtaining the physical parameters of the multiphase flow includes, at 1109B, obtaining a fluid pressure of the multiphase flow. In some implementations, obtaining the physical parameters of the multiphase flow includes, at 1109C, obtaining a liquid viscosity of the multiphase flow. In some implementations, obtaining the physical parameters of the multiphase flow includes, at 1109D, obtaining a gas density of the multiphase flow. In some implementations, obtaining the physical parameters of the multiphase flow includes, at 1109E, obtaining a liquid density of the multiphase flow. In some implementations, obtaining the physical parameters of the multiphase flow includes, at 1109F, obtaining a surface tension of the multiphase flow. The physical parameters of a multiphase flow can be obtained from sensors (e.g., downhole equipment). For example, the sensors can include pressure sensors, velocity sensors, density sensors, viscosity sensors, etc. Some or all of physical parameters can be calculated based other physical parameters and physical dimensions. For example, simulation tools (e.g., OLGA® and PETREL®) may be used to calculate the physical parameters using a model of a pipeline system.

Referring now to FIG. 11B (which continues the process illustrated in FIG. 11A, as indicated by reference "A"), at 1113, the system can determine an effective roughness of a liquid film (e.g., liquid film 209) on an interior wall (e.g., interior wall of the pipe 203). (See, e.g., FIG. 10, 1013.) According to aspects of the present disclosure, the system can determine the effective roughness ($k_E$) using the physical dimensions obtained at 1105 and the physical parameters determined at 1109 based on Equations 14, 18 and 19 above. In implementations, at 1113A, the system can determine the effective roughness due to the viscosity of the liquid film using Equation 18 above. Additionally, in implementations, the system can determine the effective roughness due to surface tension of the liquid film at 1113, using Equation 19 above. At 1113C, using Equation 14, some implementations of the system can determine the effective roughness by selecting a maximum of the effective roughness due to viscosity determined at 1113A and the effective roughness due to surface tension determined at 1113B.

At 1117, the system can determine a pressure drop (−dp/dx) in the pipe using the effective roughness determined at 1113. (See, e.g., FIG. 10, 1017.) In implementations, using Equation 1, the system can determine a pressure gradient (e.g., Pa/m) for the effective roughness and the physical parameters determined at 1109. At 1121, the system can select one or more operating parameters for the liquid transport system (e.g., flow velocity, pressure, and fluid temperatures) in the pipelines based on the pressure drop determined at 1117. See, e.g., FIG. 10, 1021.) In some implementations, at 1121A, the system can determine an operating rate of a pump of the fluid transport system (e.g., equipment 157 or equipment 158) that provides a target amount of pressure, adjusted for the pressure drop determined at 1117. In some implementations, at 1121B, the system can determine a physical dimension of the pipe (e.g., diameter) that provides a target value of pressure, adjusted for the pressure drop determined at 1117.

Referring now to FIG. 11C (which continues the process illustrated in FIGS. 11A and 11B, as indicated by reference "B"), at 1125, the system can operate the fluid transport system using the operating parameters determined at 1121. (See, e.g., FIG. 10, 1025.) In some implementations, at 1125A, the system can operate a pump at the rate determined at 1121A. In some implementations, at 1125B, the system can operate the fluid transport system using a pipe (e.g., a replacement pipe) having the diameter determined at 1121B.

The foregoing description, for purpose of explanation, has been described with reference to specific implementations. However, the illustrative discussions above are not intended to be exhaustive or to limit implementations to the precise forms disclosed. Many modifications and variations are possible in view of the above teachings. Moreover, the order in which the elements of the methods described herein are illustrated and described may be re-arranged, and/or two or more elements may occur simultaneously. The implementations were chosen and described in order to explain the principals of implementations and its practical applications, to thereby enable others skilled in the art to utilize implementations and various implementations with various modifications as are suited to the particular use contemplated.

What is claimed is:

1. A method for improving flow of a multiphase mixture in a fluid transport system, the method comprising:
    obtaining one or more physical dimensions of a pipe configured to transport a multiphase fluid flow wherein a liquid film covers an interior wall of the pipe;
    obtaining one or more physical parameters of the multiphase fluid flow in the pipe;
    determining an effective roughness of the liquid film based on a first roughness parameter that accounts for viscosity of the liquid film and a second roughness parameter that accounts for surface tension of the liquid film, wherein the first and second roughness parameters are derived from the one or more physical dimensions of the pipe and the one or more physical parameters of the multiphase fluid flow;
    determining a pressure drop in the pipe using the effective roughness of the liquid film; and
    determining one or more operating parameters of the fluid transport system based on the pressure drop in the pipe.

2. The method of claim 1, wherein the one or more physical dimensions of the pipe comprises a diameter of the pipe.

3. The method of claim 1, wherein the one or more physical parameters of the multiphase fluid flow include one or more of gas density, liquid density, gas velocity, surface tension, shear stress, and coefficient of friction.

4. The method of claim 1, wherein:
    the first roughness parameter is derived from, a density of liquid, a density of gas, a velocity of gas, a diameter of gas, and a kinematic viscosity of the liquid;
    the second roughness parameter is derived from a density of gas, a velocity of gas, a diameter of gas, and a surface tension of gas and liquid; and
    the effective roughness of the liquid film is determined by selecting a maximum one of the first roughness parameter and the second roughness parameter.

5. The method of claim 1, wherein:
    determining the one or more operating parameters comprises determining an operating rate of a pump of the fluid transport system; and
    the method further comprises operating the pump using the operating rate.

6. The method of claim 1, wherein:
    determining the one or more operating parameters comprises determining a diameter for the pipe; and
    the method comprises operating the fluid transport system using a second pipe corresponding to the diameter.

7. The method of claim 1, wherein:
    the first and second roughness parameters are derived by an energy balance in which turbulent kinetic energy in the vicinity of an interface between the liquid film and the multiphase fluid flow balances viscous dissipation and surface energy associated with distortion of the liquid film.

8. A system for improving flow of a multiphase mixture in a fluid transport system, the system comprising
    one or more processors; and
    a memory system comprising one or more non-transitory computer-readable media storing instructions that, when executed by at least one of the one or more processors, cause the computing system to perform operations, the operations comprising:
    obtaining one or more physical dimensions of a pipe configured to transport a multiphase fluid flow wherein a liquid film covers an interior wall of the pipe;
    obtaining one or more physical parameters of the multiphase fluid flow in the pipe;
    determining an effective roughness of a liquid film based on a first roughness parameter that accounts for viscosity of the liquid film and a second roughness parameter that accounts for surface tension of the liquid film, wherein the first and second roughness parameters are derived from the one or more physical dimensions of the pipe and using the one or more physical parameters of the multiphase fluid flow;
    determining a pressure drop in the pipe using the effective roughness of the liquid film; and
    determining one or more operating parameters of the fluid transport system based on the pressure drop in the pipe.

9. The system of claim 8, wherein the one or more physical dimensions of the pipe comprises a diameter of the pipe.

10. The system of claim 8, wherein the one or more physical parameters of the multiphase fluid flow include one or more of gas density, liquid density, gas velocity, surface tension, shear stress, and coefficient of friction.

11. The system of claim 8, wherein:
    the first roughness parameter is derived from a density of liquid, a density of gas, a velocity of gas, a diameter of gas, and a kinematic viscosity of liquid;
    the second roughness parameter is derived from a density of gas, a velocity of gas, a diameter of gas, and a surface tension of gas and liquid; and
    the effective roughness of the liquid film is determined by selecting a maximum one of the first roughness parameter and the second roughness parameter.

12. The system of claim 8, wherein:
    the first and second roughness parameters are derived by an energy balance in which turbulent kinetic energy in the vicinity of an interface between the liquid film and the multiphase fluid flow balances viscous dissipation and surface energy associated with distortion of the liquid film.

13. The system of claim 8, wherein:
    the effective roughness of the liquid film is determined by adding or superimposing the first and second roughness parameters.

14. The system of claim 8, wherein:
    the energy balance involves a wave height parameter that is related to the effective roughness of the liquid film.

15. A non-transitory computer-readable medium storing instructions that, when executed by one or more processors of a computing system, cause the computing system to perform operations, the operations comprising:
- obtaining one or more physical dimensions of a pipe configured to transport a multiphase fluid flow wherein a liquid film covers an interior wall of the pipe;
- obtaining one or more physical parameters of the multiphase fluid flow in the pipe;
- determining an effective roughness of the liquid film based on a first roughness parameter that accounts for viscosity of the liquid film and a second roughness parameter that accounts for surface tension of the liquid film, wherein the first and second roughness parameters are derived from the one or more physical dimensions of the pipe and using the one or more physical parameters of the multiphase fluid flow;
- determining a pressure drop in the pipe using the effective roughness of the liquid film; and
- determining one or more operating parameters of the fluid transport system based on the pressure drop in the pipe.

16. The non-transitory computer-readable medium of claim 15, wherein:
the first roughness parameter is derived from a density of liquid, a density of gas a velocity of gas, a diameter of gas, and a kinematic viscosity of liquid;
the second roughness parameter is derived from a density of gas, a velocity of gas, a diameter of gas, and a surface tension of gas and liquid; and
the effective roughness of the liquid film is determined by selecting a maximum one of the first roughness parameter and the second roughness parameter.

17. The method of claim 16, wherein:
the effective roughness of the liquid film is determined by adding or superimposing the first and second roughness parameters.

18. The method of claim 16, wherein:
the energy balance involves a wave height parameter that is related to the effective roughness of the liquid film.

19. The non-transitory computer-readable medium of claim 15, wherein:
the first and second roughness parameters are derived by an energy balance in which turbulent kinetic energy in the vicinity of an interface between the liquid film and the multiphase fluid flow balances viscous dissipation and surface energy associated with distortion of the liquid film.

20. The non-transitory computer-readable medium of claim 19, wherein:
the energy balance involves a wave height parameter that is related to the effective roughness of the liquid film.

21. The non-transitory computer-readable medium of claim 15, wherein:
the effective roughness of the liquid film is determined by adding or superimposing the first and second roughness parameters.

* * * * *